(12) United States Patent
Lou et al.

(10) Patent No.: US 12,004,169 B2
(45) Date of Patent: Jun. 4, 2024

(54) RADIO SCHEDULING METHOD AND APPARATUS

(71) Applicant: Huawei Technologies Co., Ltd., Shenzhen (CN)

(72) Inventors: Chong Lou, Shanghai (CN); Xing Liu, Shenzhen (CN); Qufang Huang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 478 days.

(21) Appl. No.: 17/207,288

(22) Filed: Mar. 19, 2021

(65) Prior Publication Data

US 2021/0212108 A1 Jul. 8, 2021

Related U.S. Application Data

(63) Continuation of application No. PCT/CN2019/107014, filed on Sep. 20, 2019.

(30) Foreign Application Priority Data

Sep. 21, 2018 (CN) .......................... 201811107463.2

(51) Int. Cl.
*H04W 72/04* (2023.01)
*H04W 72/1268* (2023.01)
(Continued)

(52) U.S. Cl.
CPC ....... *H04W 72/23* (2023.01); *H04W 72/1268* (2013.01); *H04W 72/535* (2023.01); *H04W 74/0833* (2013.01); *H04W 80/02* (2013.01)

(58) Field of Classification Search
CPC ..... H04L 1/189; H04L 1/1893; H04L 1/1896; H04W 4/08; H04W 72/04; H04W 72/12;
(Continued)

(56) References Cited

U.S. PATENT DOCUMENTS 10,111,190 B2 * 10/2018 Pelletier .............. H04W 52/246
10,575,304 B2 * 2/2020 Faurie ............... H04W 72/0453
(Continued)

FOREIGN PATENT DOCUMENTS

CN 106455093 A 2/2017
CN 106961741 A 7/2017
(Continued)

OTHER PUBLICATIONS

"New MCS table and LCP restrictions," 3GPP TSG-RAN WG2 Meeting #AH NR 1802, Montreal, Canada, R2-1810426, pp. 1-4, 3rd Generation Partnership Project, Valbonne, France (Jul. 2-6, 2018).

(Continued)

*Primary Examiner* — Frank Duong
(74) *Attorney, Agent, or Firm* — Leydig, Voit & Mayer, Ltd.

(57) ABSTRACT

This application provides a radio scheduling method and apparatus. The radio scheduling method includes: receiving, by a terminal, a first message from a network device, where the first message indicates at least one index, each of the at least one index associated to an uplink grant resource corresponding to a logical channel; obtaining, by the terminal, a first uplink grant resource from the network device; determining, by the terminal, a first logical channel based on an index of the first uplink grant resource and the at least one index, wherein the at least one index comprises the index of the first uplink grant resource. The radio scheduling method in embodiments of this application helps ensure that the terminal selects an appropriate logical channel, thereby helping satisfy reliability requirements of different services.

14 Claims, 11 Drawing Sheets

(51) Int. Cl.
*H04W 72/23* (2023.01)
*H04W 72/50* (2023.01)
*H04W 74/0833* (2024.01)
*H04W 80/02* (2009.01)

(58) Field of Classification Search
CPC ............. H04W 72/1268; H04W 72/23; H04W 72/535; H04W 74/08; H04W 74/0833; H04W 80/02
See application file for complete search history.

(56) References Cited

U.S. PATENT DOCUMENTS

| | | | |
|---|---|---|---|
| 10,945,290 B2* | 3/2021 | Jeon | H04W 36/0085 |
| 11,324,020 B2* | 5/2022 | Yu | H04W 72/23 |
| 11,528,731 B2* | 12/2022 | Li | H04L 1/1896 |
| 2010/0281486 A1 | 11/2010 | Lu et al. | |
| 2016/0157251 A1 | 6/2016 | Schliwa-Bertling et al. | |
| 2016/0212664 A1 | 7/2016 | Uemura et al. | |
| 2019/0364586 A1* | 11/2019 | Li | H04W 72/23 |
| 2021/0212108 A1* | 7/2021 | Lou | H04W 80/02 |
| 2021/0243784 A1* | 8/2021 | Goto | H04W 72/21 |
| 2021/0298052 A1* | 9/2021 | Namba | H04L 1/1851 |

FOREIGN PATENT DOCUMENTS

| | | |
|---|---|---|
| CN | 107920390 A | 4/2018 |
| CN | 108076432 A | 5/2018 |
| CN | 108307505 A | 7/2018 |
| CN | 108401302 A | 8/2018 |
| EP | 3301986 A1 | 4/2018 |
| EP | 3562234 A1 | 10/2019 |
| WO | 2016105570 A1 | 6/2016 |
| WO | 2018133398 A1 | 7/2018 |

OTHER PUBLICATIONS

Huawei et al., "Enhancements of Uplink SPS for Uu-based V2X", 3GPP TSG-RAN WG2 #95, Gothenburg, Sweden, R2-164919, 5 pages, 3rd Generation Partnership Project, Valbonne, France (Aug. 22-26, 2016).

"3rd Generation Partnership Project; Technical Specification Group Radio Access Network; Evolved Universal Terrestrial Radio Access (E-UTRA); Medium Access Control (MAC) protocol specification(Release 15)", 3GPP TS 36.321 V15.2.0, 126 pages, 3rd Generation Partnership Project, Valbonne, France (Jul. 2018).

ZTE, "Discussion on SPS related issues", 3GPP TSG-RAN WG2 #96, Reno, USA, R2-168137, 4 pages, 3rd Generation Partnership Project, Valbonne, France (Nov. 14-18, 2016).

"3rd Generation Partnership Project; Technical Specification Group Radio Access Network; NR; Multiplexing and channel coding(Release 15)", 3GPP TS 38.212 V15.2.0, 98 pages, 3rd Generation Partnership Project, Valbonne, France (Jun. 2018).

Ericsson et al., "Sidelink SPS Configuration", 3GPP TSG-RAN WG2 #96, Reno, Nevada, USA, R2-168702, 6 pages, 3rd Generation Partnership Project, Valbonne, France (Nov. 14-18, 2016).

"3rd Generation Partnership Project; Technical Specification Group Radio Access Network; NR; Medium Access Control (MAC) protocol specification(Release 15)", 3GPP TS 38.321 V15.2.0, 73 pages, 3rd Generation Partnership Project, Valbonne, France (Jun. 2018).

"3rd Generation Partnership Project; Technical Specification Group Radio Access Network; NR; Radio Resource Control (RRC) protocol specification(Release 15)", 3GPP TS 38.331 V15.2.1, 303 pages, 3rd Generation Partnership Project, Valbonne, France (Jun. 2018).

OPPO, "Modelling of the profile for LCP," 3GPP TSG RAN WG2 #99, Berlin, Germany, R2-1707738, XP051317699, total 4 pages, 3rd Generation Partnership Project, Valbonne, France (Aug. 21-25, 2017).

* cited by examiner

RADIO SCHEDULING METHOD AND APPARATUS

CROSS-REFERENCE TO RELATED APPLICATIONS

This application is a continuation of International Application No. PCT/CN2019/107014, filed on Sep. 20, 2019, which claims priority to Chinese Patent Application No. 201811107463.2, filed on Sep. 21, 2018. The disclosures of the aforementioned applications are hereby incorporated by reference in their entireties.

TECHNICAL FIELD

This application relates to the communications field, and more specifically, to a radio scheduling method and apparatus.

BACKGROUND

In a wireless communications system, a network device may schedule a terminal in two manners: dynamic scheduling and preconfigured resource scheduling. For example, when user equipment (UE) sends uplink data, the network device sends a dynamic uplink grant (UL grant) or a preconfigured UL grant, to indicate to the terminal to complete uplink data sending.

A constraint relationship from a logical channel (LCH) to a preconfigured UL grant type 1 (Type 1 for short below) is introduced into a new radio (NR) system. To be specific, the network device indicates, for each LCH, whether a resource of the Type 1 can be used. If the network device indicates that the LCH can use the resource of the Type 1, when the terminal needs to schedule a UL grant corresponding to the Type 1, the terminal may select the LCH; otherwise, the terminal does not select the LCH to participate in scheduling of the UL grant.

When the network device configures a plurality of sets of available preconfigured UL grant resources, uplink scheduling parameters corresponding to different preconfigured UL grant resources may be different, and different uplink scheduling parameters have different reliability assurance and latency assurance. Therefore, when the network device configures a plurality of sets of preconfigured UL grants, reliability requirements of different services cannot be satisfied only by configuring the constraint relationship from the LCH to the Type 1.

SUMMARY

In view of this, this application provides a radio scheduling method and apparatus, to satisfy different service quality requirements, such as reliability and a latency, of different services.

According to a first aspect, a radio scheduling method is provided. The method includes: receiving, by a terminal, a first message from a network device, where the first message includes a repetition quantity parameter of a logical channel; obtaining, by the terminal, a first uplink grant resource from the network device; determining, by the terminal, a first logical channel based on a repetition quantity of the first uplink grant resource and the repetition quantity parameter of the logical channel, where the first logical channel is a logical channel whose repetition quantity parameter satisfies a repetition quantity requirement of the first uplink grant resource; and sending, by the terminal, service data of the first logical channel by using the first uplink grant resource. The first message is used to configure the logical channel and includes a first parameter, and the first parameter includes, for example, the repetition quantity parameter of the logical channel. In addition, the first message is used to configure one or more logical channels, in other words, the first message includes one or more repetition quantity parameters of one or more logical channels. The first logical channel is a logical channel, in the one or more logical channels, that satisfies the repetition quantity requirement of the first uplink grant resource.

In certain embodiments, the sending, by the terminal, service data of the first logical channel by using the first uplink grant resource includes: sending, by the terminal, the service data of the first logical channel to the network device by using the first uplink grant resource.

In certain embodiments, the sending, by the terminal, service data of the first logical channel by using the first uplink grant resource includes: sending, by the terminal, the service data of the first logical channel to another terminal by using the first uplink grant resource.

In certain embodiments, the terminal sends the service data of the first logical channel to another terminal through a PC5 interface.

According to the first aspect, another radio scheduling method is provided. The method includes: receiving, by a terminal, a first message from a network device, where the first message includes a repetition quantity parameter of a flow, a proximity-based service per-packet priority (PPPP), or a proximity-based service per-packet reliability (PPPR); receiving, by the terminal, at least one uplink grant resource from the network device; and determining, by the terminal, a first flow, a first PPPP, or a first PPPR based on a repetition quantity of the at least one uplink grant resource and the repetition quantity parameter of the flow, the PPPP, or the PPPR, where the first flow, the first PPPP, or the first PPPR is a flow, a PPPP, or a PPPR whose repetition quantity parameter satisfies a repetition quantity requirement of a first uplink grant resource; and the first message is used to configure the flow, the PPPP, or the PPPR, and a first parameter includes, for example, the repetition quantity parameter of the flow, the PPPP, or the PPPR. In addition, the first message is used to configure one or more flows, PPPPs, or PPPRs, in other words, the first message includes one or more repetition quantity parameters of one or more flows, PPPPs, or PPPRs. The first flow, the first PPPP, or the first PPPR is a flow, a PPPP, or a PPPR, in the one or more flows, PPPPs, or PPPRs, that satisfies the repetition quantity requirement of the first uplink grant resource.

The terminal sends service data of the first flow or the first PPPP to the network device by using the first uplink grant resource.

According to the radio scheduling methods in this embodiment of this application, the network device configures the repetition quantity parameter corresponding to the logical channel, the flow, the PPPP, or the PPPR. This helps ensure that the terminal selects an appropriate logical channel, flow, PPPP, or PPPR, thereby helping satisfy reliability requirements of different services.

With reference to the first aspect, in certain embodiments of the first aspect, the repetition quantity parameter includes a minimum repetition quantity, and a minimum repetition quantity of the first logical channel is less than or equal to the repetition quantity of the first uplink grant resource.

According to the radio scheduling methods in this embodiment of this application, the terminal selects an appropriate logical channel, flow, PPPP, or PPPR based on a minimum repetition quantity of each logical channel, each flow, each PPPP, or each PPPR and a repetition quantity of an uplink grant resource. This helps satisfy reliability requirements of different services.

With reference to the first aspect, in certain embodiments of the first aspect, the repetition quantity parameter includes one or more repetition quantities, and the repetition quantity parameter of the first logical channel includes the repetition quantity of the first uplink grant resource.

According to the radio scheduling methods in this embodiment of this application, the terminal selects an appropriate logical channel, flow, PPPP, or PPPR based on one or more repetition quantities of the logical channel, the flow, the PPPP, or the PPPR and a repetition quantity of an uplink grant resource. This helps satisfy reliability requirements of different services.

With reference to the first aspect, in certain embodiments of the first aspect, the first message further includes one or more of the following parameters: a scheduling periodicity parameter, a modulation and coding scheme parameter, power information, or frequency hopping information of the logical channel. In the following, another parameter other than the repetition quantity is referred to as a second parameter, that is, the second parameter includes one or more of the foregoing parameters.

With reference to the first aspect, in certain embodiments of the first aspect, the first logical channel is a logical channel whose repetition quantity parameter satisfies the repetition quantity requirement of the first uplink grant resource and for which the second parameter satisfies a parameter requirement corresponding to the first uplink grant resource. When the first message includes a plurality of parameters, all the parameters may be limited to be used to select a logical channel, or some parameters may be limited to be used to select a logical channel. In other words, the first logical channel is a logical channel for which all or some parameters in the first message satisfy the parameter requirement corresponding to the first uplink grant resource.

The second parameter may also be configured for the flow, the PPPP, or the PPPR, and the first flow, the first PPPP, or the first PPPR is determined through a method similar to that of the logical channel. In other words, the first flow, the first PPPP, or the first PPPR is a flow, a PPPP, or a PPPR for which all or some parameters in the first message satisfy the parameter requirement corresponding to the first uplink grant resource.

According to the radio scheduling methods in this embodiment of this application, the network device configures the repetition quantity parameter and the second parameter that correspond to the logical channel, the flow, the PPPP, or the PPPR. This helps ensure that the terminal selects an appropriate logical channel, flow, PPPP, or PPPR, thereby helping satisfy reliability and latency requirements of different services.

With reference to the first aspect, in certain embodiments of the first aspect, the second parameter includes the scheduling periodicity parameter, the scheduling periodicity parameter includes a maximum scheduling periodicity, and a maximum scheduling periodicity of the first logical channel is greater than or equal to a scheduling periodicity of the first uplink grant resource. The logical channel herein may be replaced with the flow, the PPPP, or the PPPR.

According to the radio scheduling methods in this embodiment of this application, the terminal selects an appropriate logical channel, flow, PPPP, or PPPR based on the minimum repetition quantity and a maximum scheduling periodicity of the logical channel, the flow, the PPPP, or the PPPR and the repetition quantity and a scheduling periodicity of the uplink grant resource. This helps satisfy reliability and latency requirements of different services.

With reference to the first aspect, in certain embodiments of the first aspect, the second parameter includes the scheduling periodicity parameter, the scheduling periodicity parameter includes one or more scheduling periodicities, and a scheduling periodicity parameter of the first logical channel includes a scheduling periodicity of the first uplink grant resource. The logical channel herein may be replaced with the flow, the PPPP, or the PPPR.

According to the radio scheduling methods in this embodiment of this application, the terminal selects an appropriate logical channel, flow, PPPP, or PPPR based on the one or more repetition quantities and one or more scheduling periodicities of the logical channel, the flow, the PPPP, or the PPPR, and the repetition quantity and the scheduling periodicity of the uplink grant resource. This helps satisfy reliability and latency requirements of different services.

With reference to the first aspect, in certain embodiments of the first aspect, the obtaining, by the terminal, a first uplink grant resource from the network device includes: receiving, by the terminal, a plurality of uplink grant resources from the network device; and obtaining, by the terminal, the first uplink grant resource from the plurality of uplink grant resources.

In certain embodiments, the first logical channel is a logical channel whose repetition quantity parameter satisfies repetition quantity requirements of at least two of the plurality of uplink grant resources, and the obtaining, by the terminal, the first uplink grant resource from the plurality of uplink grant resources includes: determining, by the terminal, the first uplink grant resource from the at least two uplink grant resources.

With reference to the first aspect, in certain embodiments of the first aspect, the plurality of uplink grant resources include an uplink grant resource indicated by a random access response RAR and a preconfigured uplink grant resource, and the first uplink grant resource is the uplink grant resource indicated by the RAR.

With reference to the first aspect, in certain embodiments of the first aspect, the first uplink grant resource is an uplink grant resource whose repetition quantity satisfies a condition.

In certain embodiments, the repetition quantity of the first uplink grant resource is greater than a repetition quantity of another uplink grant resource in the at least two uplink grant resources.

In certain embodiments, the first uplink grant resource is an uplink grant resource whose scheduling periodicity satisfies a condition.

In certain embodiments, the scheduling periodicity of the first uplink grant resource is less than a scheduling periodicity of another uplink grant resource in the at least two uplink grant resources.

In certain embodiments, the first uplink grant resource is an uplink grant resource whose target block error rate satisfies a condition.

In certain embodiments, the target block error rate of the first uplink grant resource is less than a target block error rate of another uplink grant resource in the at least two uplink grant resources.

In certain embodiments, the first uplink grant resource is an uplink grant resource whose transmit power satisfies a condition.

In certain embodiments, the transmit power of the first uplink grant resource is greater than transmit power of another uplink grant resource in the at least two uplink grant resources.

In certain embodiments, the first uplink grant resource is an uplink grant resource whose frequency hopping information satisfies a condition.

In certain embodiments, the first uplink grant resource is an uplink grant resource on which frequency hopping is enabled.

In certain embodiments, a priority of the first logical channel selected based on the first uplink grant resource is higher than a priority of a logical channel selected based on the another uplink grant resource in the at least two uplink grant resources.

In certain embodiments, sending duration of physical uplink shared channels PUSCH corresponding to the at least two uplink grant resources at least partially overlaps.

With reference to the first aspect, in certain embodiments of the first aspect, the receiving, by the terminal, an uplink grant resource from the network device includes: receiving, by the terminal, downlink control information DCI from the network device, where the DCI indicates the uplink grant resource; or receiving, by the terminal, a random access response RAR from the network device, where the RAR indicates the uplink grant resource; or receiving, by the terminal, a configuration message from the network device, where the configuration message indicates the uplink grant resource; or receiving, by the terminal, a configuration message and DCI sent by the network device, where the configuration message includes a configuration parameter of the uplink grant resource, and the DCI indicates the uplink grant resource. The uplink resource configuration method herein may be applicable to configuration of the foregoing first uplink grant resource, or applicable to configuration of the foregoing plurality of uplink resources. To be specific, the network device may configure one or more uplink grant resources for the terminal. Any one of the uplink grant resources may be configured in one of the manners, and the plurality of uplink grant resources may be configured in a same manner or different manners.

According to a second aspect, a radio scheduling method is provided. The method includes: configuring, by a network device, a first parameter of a logical channel, where the first parameter includes a repetition quantity parameter of the logical channel; and sending, by the network device, a first message to a terminal, where the first message includes the first parameter.

In another radio scheduling method: A network device configures a first parameter of a flow, a PPPP, or a PPPR, where the first parameter includes a repetition quantity parameter of the flow, the PPPP, or the PPPR; and the network device sends a first message to a terminal, where the first message includes the first parameter. Descriptions of the first parameter are the same as those in the first aspect.

With reference to the second aspect, in certain embodiments of the second aspect, the method further includes: configuring, by the network device, a second parameter of the logical channel, where the second parameter includes at least one of a scheduling periodicity parameter, a modulation and coding scheme parameter, power information, or frequency hopping information of the logical channel. Descriptions of the second parameter are the same as those in the first aspect.

In addition, the logical channel may be replaced with the flow, the PPPP, or the PPPR.

According to a third aspect, a radio scheduling method is provided. The method includes: receiving, by a terminal, a first message from a network device, where the first message includes an index of an uplink grant resource corresponding to a logical channel; obtaining, by the terminal, a first uplink grant resource from the network device; determining, by the terminal, a first logical channel based on an index of the first uplink grant resource and a first parameter, where an index of an uplink grant resource corresponding to the first logical channel includes the index of the first uplink grant resource; and sending, by the terminal, service data of the first logical channel by using the first uplink grant resource. The first message is used to configure the logical channel and includes the first parameter, and the first parameter includes, for example, the index of the uplink grant resource corresponding to the logical channel. In addition, the first message is used to configure one or more logical channels, in other words, the first message includes an index of an uplink grant resource corresponding to one or more logical channels. The first logical channel is a logical channel, in the one or more logical channels, whose index of a corresponding uplink grant resource includes the index of the first uplink grant resource. Optionally, the logical channel may be replaced with a flow, a PPPP, or a PPPR.

According to the radio scheduling method in this embodiment of this application, the network device configures an index of an uplink grant resource corresponding to the logical channel, the flow, the PPPP, or the PPPR. This helps ensure that the terminal selects an appropriate logical channel, flow, PPPP, or PPPR, thereby helping satisfy reliability and latency requirements of different services.

With reference to the third aspect, in certain embodiments of the third aspect, the obtaining, by the terminal, a first uplink grant resource from the network device includes: receiving, by the terminal, a plurality of uplink grant resources from the network device; and obtaining, by the terminal, the first uplink grant resource from the plurality of uplink grant resources. Selection of the first uplink grant resource is the same as that in the first aspect.

With reference to the third aspect, in certain embodiments of the third aspect, the receiving, by the terminal, an uplink grant resource from the network device includes: receiving, by the terminal, downlink control information DCI from the network device, where the DCI indicates the uplink grant resource; or receiving, by the terminal, a random access response RAR from the network device, where the RAR indicates the uplink grant resource; or receiving, by the terminal, a configuration message from the network device, where the configuration message indicates the uplink grant resource; or receiving, by the terminal, a configuration message and DCI sent by the network device, where the configuration message includes a configuration parameter of the uplink grant resource, and the DCI indicates the uplink grant resource. The uplink resource configuration method herein may be applicable to configuration of the foregoing first uplink grant resource, or applicable to configuration of the foregoing plurality of uplink resources. To be specific, the network device may configure one or more uplink grant resources for the terminal. Any one of the uplink grant resources may be configured in one of the manners, and the plurality of uplink grant resources may be configured in a same manner or different manners.

According to a fourth aspect, a radio scheduling method is provided. The method includes: configuring, by a network device, a first parameter of a logical channel, where the first parameter includes an index of an uplink grant resource corresponding to the logical channel; and sending, by the network device, a first message to a terminal, where the first message includes the first parameter. The logical channel may be replaced with a flow, a PPPP, or a PPPR.

According to a fifth aspect, a radio scheduling method is provided. The method includes: receiving, by a terminal, a first message from a network device, where the first message includes an index of a bandwidth part group corresponding to a logical channel; obtaining, by the terminal, a first uplink grant resource from the network device; determining, by the terminal, a first logical channel based on an index of the first uplink grant resource and a first parameter, where an index of a bandwidth part group corresponding to the first logical channel includes an index of a bandwidth part group corresponding to the first uplink grant resource; and sending, by the terminal, service data of the first logical channel by using the first uplink grant resource. The first message is used to configure the logical channel and includes the first parameter, and the first parameter includes, for example, the index of the bandwidth part group corresponding to the logical channel. In addition, the first message is used to configure one or more logical channels, in other words, the first message includes an index of a bandwidth part group corresponding to one or more logical channels. The first logical channel is a logical channel, in the one or more logical channels, whose index of a corresponding bandwidth part group includes the index of the bandwidth part group corresponding to the first uplink grant resource. Optionally, the logical channel may be replaced with a flow, a PPPP, or a PPPR.

According to the radio scheduling method in this embodiment of this application, the network device configures an index of a bandwidth part group corresponding to the logical channel, the flow, the PPPP, or the PPPR. This helps ensure that the terminal selects an appropriate logical channel, flow, PPPP, or PPPR, thereby helping satisfy reliability and latency requirements of different services.

With reference to the fifth aspect, in certain embodiments of the fifth aspect, the obtaining, by the terminal, a first uplink grant resource from the network device includes: receiving, by the terminal, a plurality of uplink grant resources from the network device; and obtaining, by the terminal, the first uplink grant resource from the plurality of uplink grant resources. Selection of the first uplink grant resource is the same as that in the first aspect.

With reference to the fifth aspect, in certain embodiments of the fifth aspect, the receiving, by the terminal, an uplink grant resource from the network device includes: receiving, by the terminal, downlink control information DCI from the network device, where the DCI indicates the uplink grant resource; or receiving, by the terminal, a random access response RAR from the network device, where the RAR indicates the uplink grant resource; or receiving, by the terminal, a configuration message from the network device, where the configuration message indicates the uplink grant resource; or receiving, by the terminal, a configuration message and DCI sent by the network device, where the configuration message includes a configuration parameter of the uplink grant resource, and the DCI indicates the uplink grant resource. The uplink resource configuration method herein may be applicable to configuration of the foregoing first uplink grant resource, or applicable to configuration of the foregoing plurality of uplink resources. To be specific, the network device may configure one or more uplink grant resources for the terminal. Any one of the uplink grant resources may be configured in one of the manners, and the plurality of uplink grant resources may be configured in a same manner or different manners.

According to a sixth aspect, a radio scheduling method is provided. The method includes: configuring, by a network device, a first parameter of a logical channel, where the first parameter includes an index of a bandwidth part group corresponding to the logical channel; and sending, by the network device, a first message to a terminal, where the first message includes the first parameter.

According to a seventh aspect, this application provides a radio scheduling apparatus, including units or means configured to perform the steps in the first aspect, the third aspect, or the fifth aspect.

According to an eighth aspect, this application provides a radio scheduling apparatus, including units or means configured to perform the steps in the second aspect, the fourth aspect, or the sixth aspect.

According to a ninth aspect, this application provides a radio scheduling apparatus, including at least one processor. The processor is configured to connect to a memory, to invoke a program in the memory to perform the method according to the first aspect, the third aspect, or the fifth aspect.

According to a tenth aspect, this application provides a radio scheduling apparatus, including at least one processor. The processor is configured to connect to a memory, to invoke a program in the memory to perform the method according to the second aspect, the fourth aspect, or the sixth aspect.

According to an eleventh aspect, this application provides a radio scheduling apparatus, including at least one processor and an interface circuit. The at least one processor is configured to perform the method according to the first aspect, the third aspect, or the fifth aspect.

According to a twelfth aspect, this application provides a radio scheduling apparatus, including at least one processor and an interface circuit. The at least one processor is configured to perform the method according to the second aspect, the fourth aspect, or the sixth aspect.

According to a thirteenth aspect, a terminal is provided. The terminal includes the apparatus according to the seventh aspect, or the terminal includes the apparatus according to the ninth aspect, or the terminal includes the apparatus according to the eleventh aspect.

According to a fourteenth aspect, a network device is provided. The network device includes the apparatus according to the eighth aspect, or the terminal includes the apparatus according to the tenth aspect, or the terminal includes the apparatus according to the twelfth aspect.

According to a fifteenth aspect, this application provides a program. When being executed by a processor, the program is used to perform the method according to the first aspect, the third aspect, or the fifth aspect.

According to a sixteenth aspect, this application provides a program. When being executed by a processor, the program is used to perform the method according to the second aspect, the fourth aspect, or the sixth aspect.

According to a seventeenth aspect, this application provides a program product, for example, a computer-readable storage medium, including the foregoing program.

DESCRIPTION OF EMBODIMENTS

Figure 1:
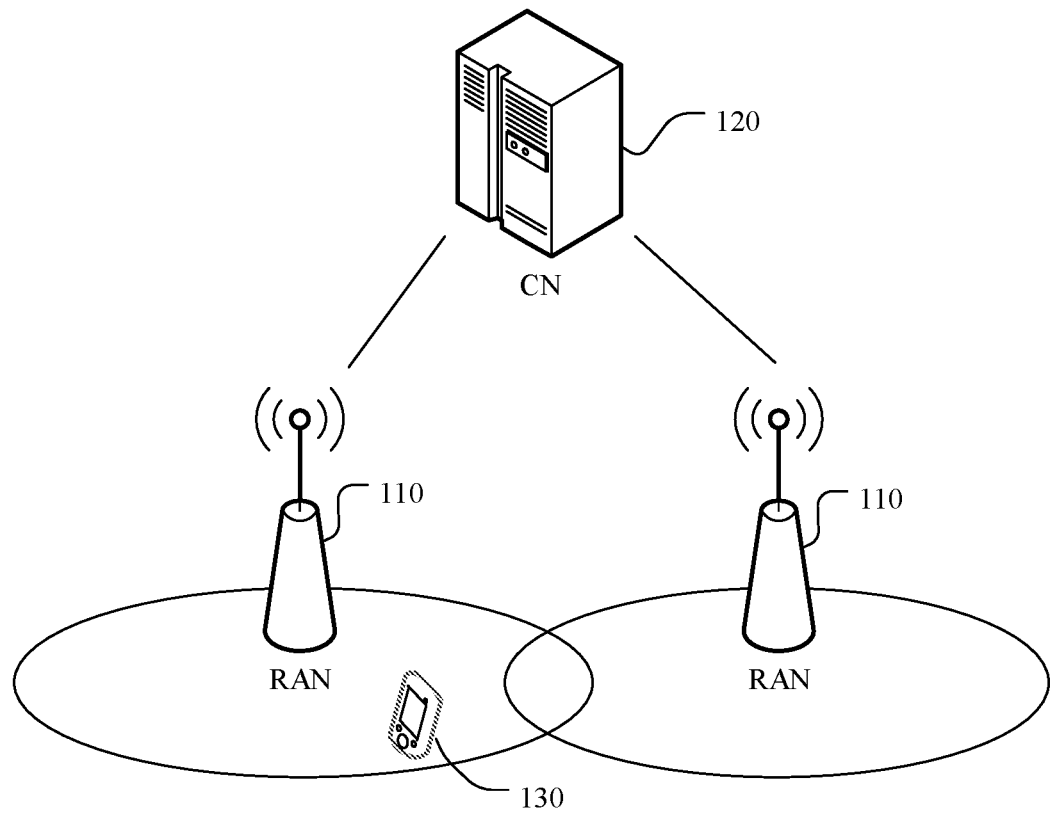
FIG. 1 is a schematic diagram of an application scenario of a technical solution according to an embodiment of this application.

The following describes some terms in this application.

(1) A terminal, also referred to as user equipment (UE), a mobile station (MS), a mobile terminal (MT), or the like, is a device that provides voice/data connectivity for a user, for example, a handheld device or a vehicle-mounted device having a wireless connection function. Currently, for example, the terminal is a mobile phone, a tablet computer, a notebook computer, a palmtop, a mobile internet device (MID), a wearable device, a virtual reality (VR) device, an augmented reality (AR) device, a wireless terminal in industrial control, a wireless terminal in self-driving, a wireless terminal in a remote surgery, a wireless terminal in a smart grid, a wireless terminal in transportation safety, a wireless terminal in a smart city, or a wireless terminal in a smart home.

(2) A network device is a device in a wireless network, for example, a radio access network (RAN) node that enables a terminal to access the wireless network. Currently, for example, the RAN node is a gNB, a transmission reception point (TRP), an evolved NodeB (eNB), a radio network controller (RNC), a NodeB (NB), a base station controller (BSC), a base transceiver station (BTS), a home base station (for example, a home evolved NodeB or a home NodeB, HNB), a baseband unit (BBU), or a wireless fidelity (Wi-Fi) access point (AP). In a network structure, the network device may include a centralized unit (CU) node, a distributed unit (DU) node, or a RAN device including a CU node and a DU node.

The technical solutions of the embodiments of this application may be applied to various communications systems, such as a global system for mobile communications (GSM) system, a code division multiple access (CDMA) system, a wideband code division multiple access (WCDMA) system, a general packet radio service (GPRS), a long term evolution (LTE) system, an LTE frequency division duplex (FDD) system, an LTE time division duplex (TDD), a universal mobile telecommunications system (UMTS), a worldwide interoperability for microwave access (WiMAX) communications system, and a future 5th generation (5G) system or new radio (NR) system.

Before the embodiments of this application are described, several concepts related to the technical solutions in the embodiments of this application are first briefly described.

Modulation and coding scheme (MCS): The modulation and coding scheme indicates a modulation scheme and a code rate of channel coding that are used for transmission. Generally, an MCS index is used as a row, a corresponding group of a modulation scheme and a code rate of channel coding is used as a corresponding column, the modulation scheme and the code rate of channel coding that are used for transmission are determined by using the MCS index, and then, a transport block size (TBS) is determined.

For example, in LTE, downlink control information (DCI) uses a 5-bit MCS index (0 to 31) to indicate a modulation and coding scheme used for current transmission, and affects selection of a TB size (TBS). There are 32 combinations for the MCS in total. Three combinations (whose indexes are 29 to 31) are reserved, and the three combinations are used only for retransmission.

Scheduling process: The network device may schedule the terminal to perform uplink transmission in a manner such as dynamic scheduling and preconfigured resource scheduling. For example, the network device indicates, by sending a dynamic UL grant or a preconfigured UL grant, the terminal to send uplink data.

Dynamic scheduling: The network device sends an uplink scheduling grant (UL grant), sends DCI, that is, a dynamic UL grant, on a physical downlink control channel (PDCCH), and performs scrambling by using a terminal identifier. If successfully decoding the control information, the terminal may obtain a size of a physical layer resource corresponding to this uplink scheduling, time domain/frequency domain distribution of the physical layer resource, and HARQ information required for this uplink scheduling transmission. Therefore, the terminal performs the HARQ process to complete uplink transmission.

Preconfigured resource scheduling: The network device may preconfigure, in a semi-static resource allocation manner, a resource required by the terminal for uplink transmission, that is, preconfigure a UL grant. It should be understood that the preconfigured UL grant may appear periodically, and the terminal does not need to obtain an uplink grant each time before uplink transmission. For example, the network device may configure a UL grant for uplink transmission by using radio resource control (RRC) signaling, and the RRC signaling may further include a periodicity of the preconfigured UL grant, so that the terminal performs transmission on the preconfigured resource scheduling. This manner may be a configured grant type 1 (configured grant type 1). The network device may configure a portion of information of uplink transmission, for example, the periodicity of the preconfigured UL grant, by using the RRC signaling, and carry the UL grant for uplink transmission in physical layer signaling and activate a resource of the uplink transmission, so that the terminal performs transmission on the preconfigured resource scheduling. This manner may be a configured grant manner 2 (configured grant type 2), and both the foregoing two manners may be referred to as preconfigured resource scheduling.

In the embodiments of this application, the "uplink grant" and the "uplink grant message" may be understood as signaling used to schedule a physical uplink resource, for example, downlink control information used for the uplink grant, or RRC signaling used for a semi-static configuration, or downlink control information used to activate an uplink grant resource in a semi-static configuration manner. The "uplink grant resource" may be understood as a resource indicated by the uplink grant. The "uplink grant", the "uplink grant message", and the "uplink grant resource" may all correspondingly be the UL grant, and a person skilled in the art may understand meanings of the "uplink grant", the "uplink grant message", and the "uplink grant resource".

In the embodiments of this application, the "protocol" may be a standard protocol in the communications field, for example, the "protocol" may include an LTE protocol, an NR protocol, and a related protocol applied to a future communications system. This is not limited in this application.

In the following embodiments, terms such as "first" and "second" are merely intended to distinguish between different objects, and should not constitute any limitation on this application.

The term "and/or" describes an association relationship for describing associated objects and represents that three relationships may exist. For example, A and/or B may represent the following three cases: Only A exists, both A and B exist, and only B exists. The character "/" generally indicates an "or" relationship between the associated objects. The term "at least one" means one or more. The term "at least one of A and B", similar to the term "A and/or B", describes an association relationship between associated objects and represents that three relationships may exist. For example, at least one of A and B may represent the following three cases: Only A exists, both A and B exist, and only B exists.

FIG. 1 is a schematic diagram of an application scenario of a technical solution according to an embodiment of this application. As shown in FIG. 1, a terminal 130 accesses a wireless network to obtain a service of an external network (for example, the internet) by using the wireless network, or communicates with another terminal by using a wireless network. The wireless network includes a RAN 110 and a core network (CN) 120. The RAN 110 is used to connect the terminal 130 to the wireless network, and the CN 120 is used to manage the terminal and provide a gateway for communicating with the external network.

It should be understood that the radio scheduling method provided in this application may be applicable to a wireless communications system, for example, the wireless communications system 100 shown in FIG. 1. There is a wireless communication connection between two communications apparatuses in the wireless communications system. One of the two communications apparatuses may correspond to the terminal 130 shown in FIG. 1, for example, may be the terminal 130 in FIG. 1, or may be a chip disposed in the terminal 130. The other communications apparatus in the two communications apparatuses may correspond to the RAN 110 shown in FIG. 1, for example, may be the RAN 110 in FIG. 1, or may be a chip disposed in the RAN 110.

Figure 2:
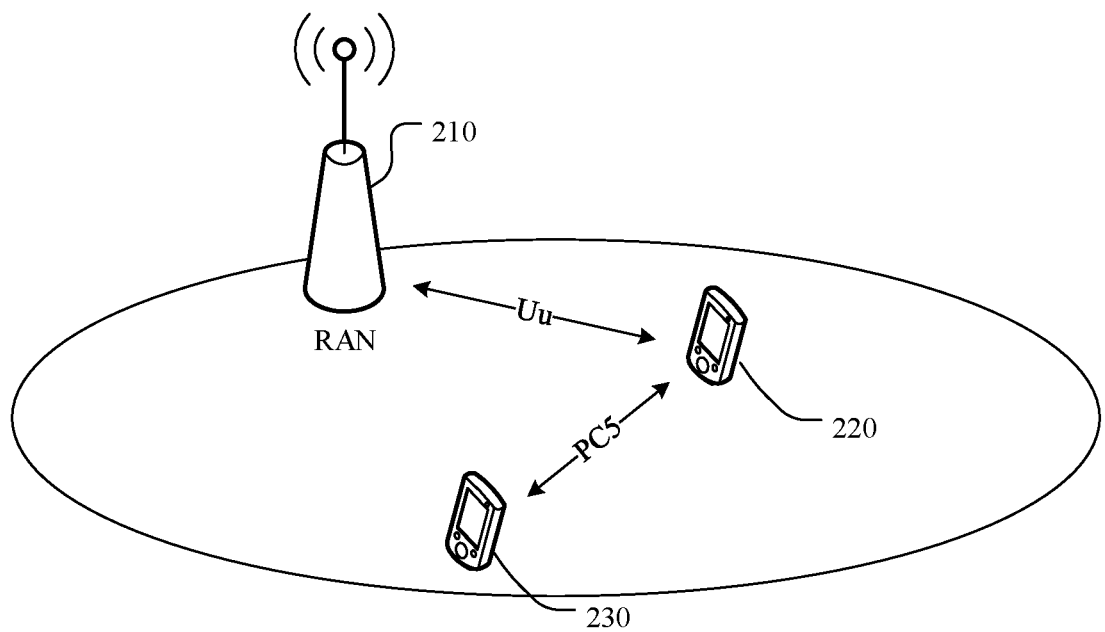
FIG. 2 is another schematic diagram of an application scenario of a technical solution according to an embodiment of this application.

FIG. 2 is another schematic diagram of an application scenario of a technical solution according to an embodiment of this application. As shown in FIG. 2, the technical solution in this embodiment of this application may be further applied to a vehicle-to-everything (V2X) system. V2X in an LTE system is used as an example, a terminal 230 communicates with a terminal 220 through a PC5 interface, and the terminal 220 communicates with a RAN 210 through a Uu interface. For the Uu interface, the RAN 210 may be configured with at least one set of preconfigured UL grants, and may be configured with a maximum of eight sets. Periodicities of different preconfigured UL grants may be different, to adapt to a feature that different V2X services have different periodicities.

The RAN 210 may configure an uplink grant resource for the terminal 220 through the Uu interface. After finding an appropriate logical channel, flow, PPPP, or PPPR on the PC5 interface, the terminal 220 sends service data corresponding to the logical channel, the flow, the PPPP, or the PPPR to the terminal 230 by using the uplink grant resource.

It should be understood that, in this embodiment of this application, the uplink grant resource used by the terminal 220 on the PC5 interface may be a preconfigured uplink grant resource, or may be a dynamic uplink grant resource. This is not limited in this embodiment of this application.

Figure 3:
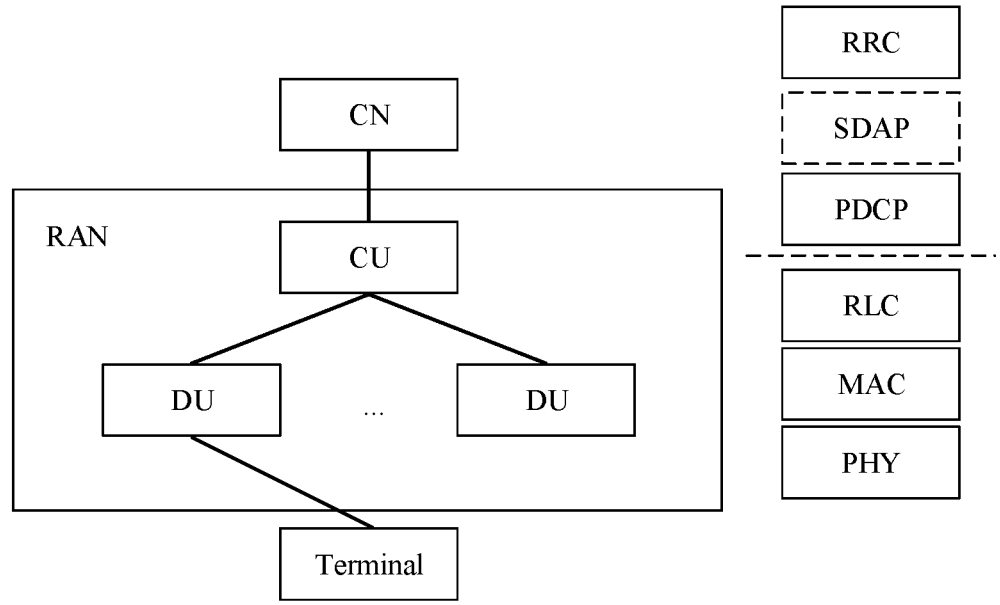
FIG. 3 is a schematic diagram of a network architecture according to an embodiment of this application.

FIG. 3 is a schematic diagram of a network architecture according to an embodiment of this application. As shown in FIG. 3, the network architecture includes a CN device and a RAN device. The RAN device includes a baseband apparatus and a radio frequency apparatus. The baseband apparatus may be implemented by one node, or may be implemented by a plurality of nodes. The radio frequency apparatus may be independently implemented remotely from the baseband apparatus, or may be integrated into the baseband apparatus, or some remote parts are integrated into the baseband apparatus. For example, in a long term evolution (LTE) communications system, a RAN device (eNB) includes a baseband apparatus and a radio frequency apparatus. The radio frequency apparatus may be remotely disposed relative to the baseband apparatus. For example, a remote radio unit (remote radio unit, RRU) is remotely disposed relative to a BBU.

Communication between the RAN device and a terminal complies with a specific protocol layer structure. For example, a control plane protocol layer structure may include functions of protocol layers such as a radio resource control (RRC) layer, a packet data convergence protocol (PDCP) layer, a radio link control (RLC) layer, a media access control (media access control, MAC) layer, and a physical layer. A user plane protocol layer structure may include functions of protocol layers such as a PDCP layer, an RLC layer, a MAC layer, and a physical layer. In an implementation, a service data adaptation protocol (SDAP) layer is further included above the PDCP layer.

The RAN device may implement functions of protocol layers such as a radio resource control (RRC) layer, a packet data convergence protocol (PDCP) layer, a radio link control (RLC) layer, and a media access control (MAC) layer by using one or more nodes. For example, in an evolved structure, the RAN device may include a centralized unit (CU) and a distributed unit (DU), and a plurality of DUs may be centrally controlled by one CU. As shown in FIG. 2, the CU and the DU may be divided based on a protocol layer of a wireless network. For example, functions of the PDCP layer and a layer above the PDCP layer are set on the CU, and functions of protocol layers below PDCP, such as the RLC layer and the MAC layer, are set on the DU.

Division based on the protocol layer is merely an example, and division may alternatively be performed at another protocol layer, for example, the RLC layer. Functions of the RLC layer and protocol layers above the RLC layer are set on the CU, and functions of protocol layers below the RLC layer are set on the DU. Alternatively, division is performed at a protocol layer, for example, some functions of the RLC layer and functions of protocol layers above the RLC layer are set on the CU, and remaining functions of the RLC layer and functions of protocol layers below the RLC layer are set on the DU. In addition, division may alternatively be performed in another manner, for example, the division is performed based on a latency. A function whose processing time needs to meet a latency requirement is set on the DU, and a function whose processing time does not need to meet the latency requirement is set on the CU.

In addition, the radio frequency apparatus may not be placed in the DU but is placed remotely from the DU, or may be integrated into the DU, or a part of the radio frequency apparatus is remotely implemented and a remaining part of the radio frequency apparatus is integrated into the DU. This is not limited herein.

Figure 4:
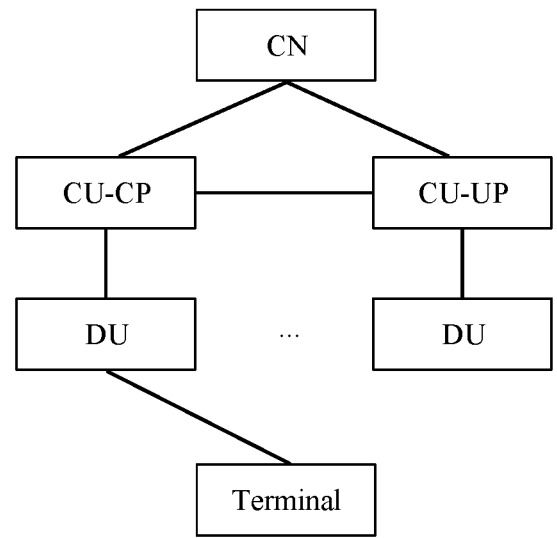
FIG. 4 is a schematic diagram of another network architecture according to an embodiment of this application.

FIG. 4 is a schematic diagram of another network architecture according to an embodiment of this application. Compared with the architecture shown in FIG. 3, a control plane (CP) and a user plane (UP) of a CU may be further separated into different entities for implementation, and the different entities are a control plane CU entity (CU-CP entity) and a user plane CU entity (CU-UP entity).

In the foregoing network architecture, signaling generated by the CU may be sent to a terminal by using a DU, or signaling generated by a terminal may be sent to the CU by using a DU. The DU may transparently transmit the signaling to the terminal or the CU by directly encapsulating the signaling at a protocol layer without parsing the signaling. In the following embodiments, if transmission of such signaling between the DU and the terminal is involved, that the DU sends or receives the signaling includes this scenario. For example, signaling at an RRC layer or a PDCP layer is finally processed as signaling at a PHY layer and sent to the terminal, or is converted from received signaling at a PHY layer. In this architecture, the signaling at the RRC layer or the PDCP layer may also be considered to be sent by the DU, or sent by the DU and a radio frequency.

In the foregoing embodiments, the CU is classified as a network device on a RAN side. In addition, the CU may alternatively be classified as a network device on a CN side. This is not limited herein.

An apparatus in the following embodiments of this application may be located in a terminal based on functions implemented by the apparatus. When the foregoing CU-DU structure is used, the network device may be a CU node, a DU node, or a RAN device including a CU node and a DU node.

Figure 5:
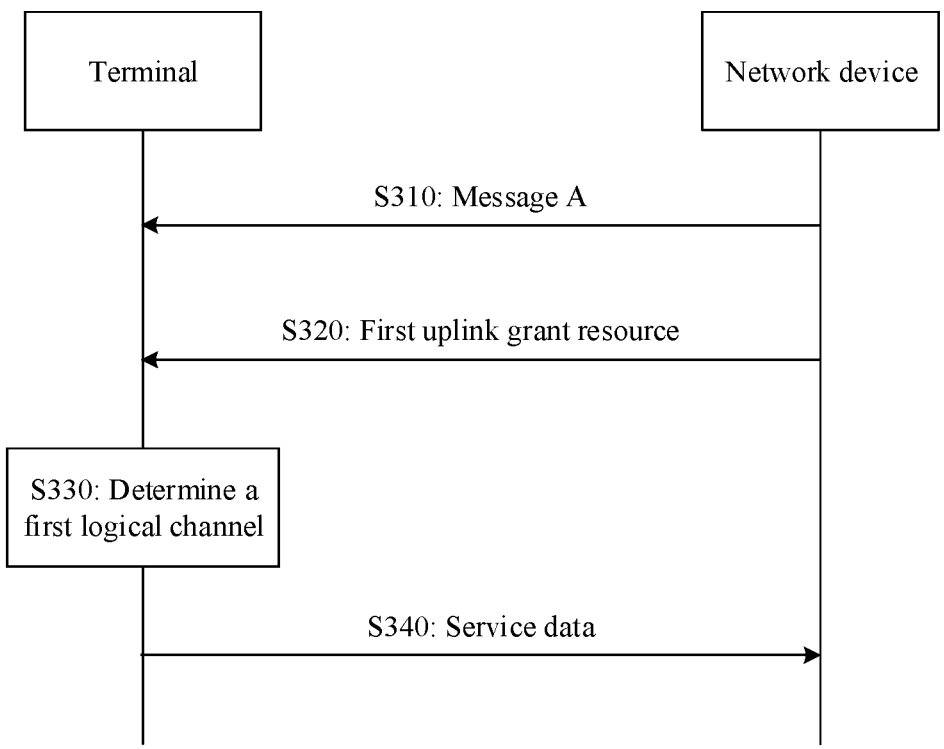
FIG. 5 is a schematic flowchart of a radio scheduling method according to an embodiment of this application.

FIG. 5 is a schematic flowchart of a radio scheduling method 300 according to an embodiment of this application. As shown in FIG. 5, an execution body of the method 300 may be a radio scheduling apparatus (for example, a terminal or a chip or an apparatus used in a terminal). The method 300 includes the following steps.

S310: The terminal receives a message A from a network device, where the message A is used to configure one or more logical channels, the message A includes a parameter A, and the parameter A includes a repetition quantity parameter of each of the one or more logical channels.

For example, the network device may configure one or more repetition quantity parameters of one or more logical channels, and send the configured parameter A to the terminal through the message A.

It should be understood that, in this embodiment of this application, the message A may be used to configure one or more logical channels, or may be used to configure a flow, a proximity-based service per-packet priority (proximity-based service per-packet priority, PPPP), or a proximity-based service per-packet reliability (proximity-based service per-packet reliability, PPPR). This embodiment of this application is not limited thereto. The following uses a logical channel as an example for description.

In this embodiment of this application, the PPPP is used to reflect a latency requirement of a service data packet in a V2X system, and the PPPR is used to reflect a reliability requirement of the service data packet in the V2X system. Therefore, both the PPPP and the PPPR may use a quantized value to indicate a latency/reliability urgency degree of the PPPP and the PPPR.

Optionally, the repetition quantity parameter includes a minimum repetition quantity.

Table 1 shows a correspondence between an index of the logical channel and the minimum repetition quantity.

TABLE 1

Correspondence between the index of the logical channel and the repetition quantity parameter

| Index of the logical channel | Minimum repetition quantity |
| --- | --- |
| LCH 1 | $K_1$ |
| LCH 2 | $K_2$ |
| ... | ... |
| LCH m | $K_m$ |

For example, the network device may configure minimum repetition quantities of m logical channels (LCH 1 to LCH m). The minimum repetition quantity of the LCH 1 is $K_1$, the minimum repetition quantity of the LCH 2 is $K_2$, and the minimum repetition quantity of the LCH m is $K_m$.

Optionally, the repetition quantity parameter includes one or more repetition quantities.

For example, each of the one or more logical channels configured by the network device may correspond to one or more repetition quantities.

Table 2 shows another correspondence between the index of the logical channel and the one or more repetition quantity parameters.

TABLE 2

Correspondence between the index of the logical channel and the one or more repetition quantities

| Index of the logical channel | Repetition quantity |
| --- | --- |
| LCH 1 | $K_1, K_2, K_3$ |
| LCH 2 | $K_4, K_5$ |
| ... | ... |
| LCH m | $K_7, K_8$ |

For example, the network device may configure repetition quantities of m logical channels (LCH 1 to LCH m). The repetition quantities of the LCH 1 are $K_1$, $K_2$, and $K_3$, the repetition quantities of the LCH 2 are $K_4$ and $K_5$, and the repetition quantities of the LCH m are $K_7$ and $K_8$.

It should be understood that in this embodiment of this application, a mapping relationship (the correspondence) between the logical channel and the repetition quantity parameter may be represented in a form of a table, or may be represented in another manner. This is not limited in this application.

S320: The terminal obtains a first uplink grant resource from the network device.

Optionally, the obtaining, by the terminal, a first uplink grant resource from the network device includes:

The terminal receives at least one uplink grant resource from the network device.

The terminal obtains the first uplink grant resource from the at least one uplink grant resource.

For example, the network device may configure at least one uplink grant resource. The network device may configure an uplink scheduling parameter corresponding to each of the at least one uplink grant resource. The uplink scheduling parameter corresponding to each uplink grant resource may include one or more of a repetition quantity, a scheduling periodicity, MCS information, power information, frequency hopping information, and a transport block (transport block, TB) size.

It should be understood that, in this embodiment of this application, the at least one uplink grant resource may also be understood as at least one set of uplink grant resources. It should be understood that one set of uplink grant resources corresponds to one same group of configuration parameters. For example, if the uplink grant resource is a preconfigured uplink grant, one set of uplink grant resources corresponds to same configurations such as a periodicity and a quantity of HARQ processes. Each set of uplink grant resources in the at least one set of uplink grant resources corresponds to one set of uplink grant parameters.

Optionally, the network device may configure a plurality of uplink grant resources.

When the network device configures a plurality of sets of available uplink grant resources, each set of uplink grant resources corresponds to one group of uplink scheduling parameters, and the uplink scheduling parameters may include but are not limited to:

(1) Repetition quantity K: The repetition quantity K indicates a quantity of times that the terminal can repeatedly send a transport block (transport block, TB). In order to ensure service reliability and reduce impact of an air interface transmission failure on reliability and a latency caused by retransmission, a function of repeated sending on a preconfigured UL grant is introduced to an NR system. The network device may configure the repetition quantity, so that the terminal can perform repeated sending on a resource corresponding to the preconfigured UL grant until the repetition quantity is reached. In this way, receiving reliability is improved through repeated sending.

(2) Scheduling periodicity P: The scheduling periodicity P is used to indicate an interval between two adjacent uplink grant resources. For example, Table 3 shows a list of correspondences between an index of the uplink grant resource and the uplink scheduling parameters.

TABLE 3

Correspondences between the index of the uplink grant resource and the uplink scheduling parameters

| Index of the uplink grant resource | Uplink scheduling parameters | |
|---|---|---|
|  | Repetition quantity | Periodicity |
| UL grant config index 1 | $K_{m+1}$ | $P_{m+1}$ |
| UL grant config index 2 | $K_{m+2}$ | $P_{m+2}$ |
| ... | ... | ... |
| UL grant config index n | $K_{m+n}$ | $P_{m+n}$ |

For example, if an index of the first uplink grant resource included in the at least one uplink grant resource may be the UL grant config index 1, uplink scheduling parameters corresponding to the index of the first uplink grant resource are the repetition quantity $K_{m+1}$ and the periodicity $P_{m+1}$.

It should be understood that the correspondence between the index of the uplink grant resource and the uplink scheduling parameter shown in the foregoing table is merely an example. The uplink scheduling parameters corresponding to the index of the uplink grant resource may include more or fewer parameters. For example, the index of the uplink grant resource may correspond only to the repetition quantity, or the index of the uplink grant resource may correspond to the repetition quantity, the periodicity, and the MCS information. This is not limited in this embodiment of this application.

For example, Table 4 shows another list of correspondences between the index of the uplink grant resource and the uplink scheduling parameters.

TABLE 4

Correspondences between the index of the uplink grant resource and the uplink scheduling parameters

| Index of the uplink grant resource | Uplink scheduling parameters | | | | |
|---|---|---|---|---|---|
|  | Repetition quantity | Periodicity | MCS | Power | Frequency hopping |
| UL grant config index 1 | $K_{m+1}$ | $P_{m+1}$ | MCS table 1/MCS index 1 | Power offset #1 | Enable (enable) |
| UL grant config index 2 | $K_{m+2}$ | $P_{m+2}$ | MCS table 2/MCS index 2 | Power offset #2 | Enable (enable) |
| ... | ... | ... | ... | ... | ... |
| UL grant config index n | $K_{m+n}$ | $P_{m+n}$ | MCS table n/MCS index n | Power offset #n | Disable (disable) |

In this embodiment of this application, the uplink scheduling parameters corresponding to each set of uplink grant resources may further include:

(1) MCS information: The MCS information may indicate an MCS table, and different MCS tables may indicate different target block error rates (target block error rate, target BLER). For example, a target BLER of the MCS table 1 is $10^{-1}$ or $10^{-3}$, and a target BLER of the MCS table 2 is $10^{-5}$. For another example, the MCS information may indicate a modulation and coding scheme, different modulation and coding schemes may indicate different combinations of modulation schemes and coding schemes. For example, the MCS index #1 indicates a combination of quadrature phase shift keying ( ) and a 120 target code rate, and the MCS index #2 indicates a combination of 16 quadrature amplitude modulation (quadrature amplitude modulation, QAM) and a 340 target code rate.

(2) Power information: The power information may indicate a power offset, that is, an offset value based on current power is used as target transmit power.

(3) Frequency hopping information: The frequency hopping information may indicate whether frequency hopping is enabled.

(4) Transport block size (TBS) information: The transport block size information may indicate, in a unit of bit or byte, a size of a transport block in this transmission.

Optionally, the at least one uplink grant resource includes a dynamic uplink grant resource.

Optionally, the receiving, by the terminal, at least one uplink grant resource from the network device includes:

The terminal receives downlink control information (DCI) from the network device, where the DCI indicates the at least one uplink grant resource.

Optionally, the receiving, by the terminal, at least one uplink grant resource from the network device includes:

The terminal receives a random access response (RAR) from the network device, where the RAR indicates the at least one uplink grant resource.

It should be understood that the random access response in this embodiment of this application may also be referred to as a random access process message 2 (Msg2).

Optionally, the at least one uplink grant resource includes a preconfigured uplink grant resource.

Optionally, the receiving, by the terminal, at least one uplink grant resource from the network device includes:

The terminal receives a configuration message sent by the network device, where the configuration message indicates the at least one uplink grant resource.

Alternatively, the terminal receives a configuration message and DCI from the network device, where the configuration message includes a configuration parameter of the at least one uplink grant resource, and the DCI indicates the at least one uplink grant resource.

Optionally, the configuration message is radio resource control (radio resource control, RRC) signaling.

It should be understood that, in this embodiment of this application, the at least one uplink grant resource may be all dynamic uplink grant resources, or may be all preconfigured uplink grant resources. Alternatively, when the at least one uplink grant resource is a plurality of uplink grant resources, the plurality of uplink grant resources include a preconfigured uplink grant resource and a dynamic uplink grant resource. This is not limited in this embodiment of this application.

It should be understood that a sequence of S310 and S320 is not limited in this embodiment of this application.

S330: The terminal determines a first logical channel based on a repetition quantity of the first uplink grant resource and the repetition quantity parameter of the one or more logical channels, and the first logical channel is a logical channel whose repetition quantity parameter satisfies a repetition quantity requirement of the first uplink grant resource.

Optionally, the at least one uplink grant resource includes the first uplink grant resource.

Optionally, when the repetition quantity parameter includes the minimum repetition quantity, that the first logical channel is a logical channel whose repetition quantity parameter satisfies a repetition quantity requirement of the first uplink grant resource may be understood as that a minimum repetition quantity of the first logical channel is less than or equal to the repetition quantity of the first uplink grant resource.

Specifically, when the terminal receives the message A and the first uplink grant resource, a physical (PHY) layer of the terminal indicates the repetition quantity of the first uplink grant resource to a media access control (MAC) layer. Optionally, the repetition quantity may be included in uplink information indicated by the physical layer to the MAC layer. The MAC layer compares a minimum repetition quantity of each logical channel with the repetition quantity of the first uplink grant resource, to determine the first logical channel.

For example, the correspondence between the logical channel configured by the network device and the repetition quantity parameter is shown in Table 1, and the correspondence between the uplink grant resource and the uplink scheduling parameter is shown in Table 3 or Table 4. The index of the first uplink grant resource may be the UL grant config index 1, the repetition quantity corresponding to the index of the first uplink grant resource is $K_{m+1}$, and the MAC layer determines that the minimum repetition quantity $K_1$ of the LCH 1 is greater than $K_{m+1}$, so that the MAC layer may determine that a repetition quantity parameter of the LCH 1 does not satisfy the repetition quantity requirement of the first uplink grant resource.

For another example, if the MAC layer determines that the minimum repetition quantity $K_2$ of the LCH 2 is less than $K_{m+1}$, the MAC layer may determine that a repetition quantity parameter of the LCH 2 satisfies the repetition quantity requirement of the first uplink grant resource, and the terminal may determine that the LCH 2 is an appropriate logical channel.

For another example, if the MAC layer determines that the minimum repetition quantity $K_3$ of the LCH 3 is equal to $K_{m+1}$, the MAC layer may determine that a repetition quantity parameter of the LCH 3 also satisfies the repetition quantity requirement of the first uplink grant resource, and the terminal may determine that the LCH 3 is also an appropriate logical channel.

It should be understood that, in this embodiment of this application, that the first logical channel is a logical channel whose repetition quantity parameter satisfies a repetition quantity requirement of the first uplink grant resource may also be understood as that the minimum repetition quantity of the first logical channel is less than the repetition quantity of the first uplink grant resource. For example, if the MAC layer determines that the minimum repetition quantity $K_3$ of the LCH 3 is equal to $K_{m+1}$, the MAC layer may determine that the repetition quantity parameter of the LCH 3 does not satisfy the repetition quantity requirement of the first uplink grant resource.

Optionally, when the repetition quantity parameter includes one of more repetition quantities, that the first logical channel is a logical channel whose repetition quantity parameter satisfies a repetition quantity requirement of the first uplink grant resource may be understood as that the repetition quantity parameter of the first logical channel includes the repetition quantity of the first uplink grant resource.

For example, when the terminal receives the message A and the first uplink grant resource, a physical (PHY) layer of the terminal sends uplink information to a media access control layer (MAC) layer. The MAC layer compares one of more repetition quantities of each logical channel with the repetition quantity of the first uplink grant resource, to determine the first logical channel.

For example, the correspondence between the logical channel configured by the network device and the repetition quantity parameter is shown in Table 2, and the correspondence between the uplink grant resource and the uplink scheduling parameter is shown in Table 3 or Table 4. The index of the first uplink grant resource may be the UL grant config index 1, the repetition quantity corresponding to the index of the first uplink grant resource is $K_{m+1}$, the MAC layer determines that the repetition quantity of the LCH 1 includes $K_1$, $K_2$, and $K_3$, and each of $K_1$, $K_2$, and $K_3$ is different from $K_{m+1}$, so that the MAC layer may determine that a repetition quantity parameter of the LCH 1 does not satisfy the repetition quantity requirement of the first uplink grant resource.

For another example, if the MAC layer determines that the repetition quantity of the LCH 2 includes $K_4$ and $K_5$, and $K_4$ is equal to $K_{m+1}$, the MAC layer may determine that a repetition quantity parameter of the LCH 2 satisfies the repetition quantity requirement of the first uplink grant resource, and the terminal may determine that the LCH 2 is an appropriate logical channel.

It should be understood that, when determining whether a logical channel is an appropriate logical channel, the MAC may "strictly" determine that $K_{m+1}$ is equal to a repetition quantity in one or more repetition quantities of the logical channel, and then determine that the logical channel is an appropriate logical channel. Alternatively, the MAC may "unstrictly" determine that, for example, the repetition quantity of the LCH 3 is $K_6$, and a difference between $K_6$ and $K_{m+1}$ falls within an interval [a, b]. Optionally, an allowed interval of the difference may be sent by the network device to the terminal, and the terminal may also determine that the LCH 3 is an appropriate logical channel.

It should be further understood that, in this embodiment of this application, the repetition quantity parameter of the logical channel is not limited to the foregoing examples, and may be in another manner. For example, the repetition quantity parameter of the logical channel may be an interval. If the repetition quantity of the first uplink grant resource is within the interval, the logical channel may be determined as an appropriate logical channel.

It should be further understood that after the PHY layer of the terminal indicates the repetition quantity of the first uplink grant resource to the MAC layer, the PHY layer may continue to indicate a repetition quantity of another uplink grant resource in the at least one uplink grant resource to the MAC layer, and the MAC layer may further determine a logical channel that satisfies a repetition quantity requirement of the another uplink grant resource.

Optionally, the MAC may determine that the first logical channel satisfies repetition quantity requirements of a plurality of uplink grant resources.

Optionally, the message A further includes a parameter B, and the parameter B includes one or more of a scheduling periodicity parameter, a modulation and coding scheme parameter, power information, or frequency hopping information of the one or more logical channels.

Optionally, the parameter B includes the scheduling periodicity parameter of the one or more logical channels, and the scheduling periodicity parameter includes a maximum scheduling periodicity.

Table 5 shows correspondences between the index of the logical channel, the minimum repetition quantity, and the maximum scheduling periodicity.

TABLE 5

Correspondences between the index of the logical channel, the minimum repetition quantity, and the maximum scheduling periodicity

| Index of the logical channel | Uplink scheduling parameters | |
|---|---|---|
| | Minimum repetition quantity | Maximum periodicity |
| LCH 1 | $K_1$ | $P_1$ |
| LCH 2 | $K_2$ | $P_2$ |
| . . . | . . . | . . . |
| LCH m | $K_m$ | $P_m$ |

Optionally, the first logical channel is a logical channel whose repetition quantity parameter satisfies the repetition quantity requirement of the first uplink grant resource and for which the parameter B satisfies a parameter requirement corresponding to the first uplink grant resource.

Optionally, the parameter B includes the scheduling periodicity parameter, the scheduling periodicity parameter is a maximum scheduling periodicity, and the logical channel for which the parameter B satisfies the parameter requirement corresponding to the first uplink grant resource may be understood as that a maximum scheduling periodicity of the first logical channel is greater than or equal to a scheduling periodicity of the first uplink grant resource.

For example, when the terminal receives the message A and the first uplink grant resource, the physical (PHY) layer of the terminal indicates the scheduling periodicity of the first uplink grant resource to the media access control (MAC) layer. Optionally, the scheduling periodicity may be included in uplink information indicated by the PHY layer to the MAC. The MAC layer compares a maximum scheduling periodicity of each logical channel with the scheduling periodicity of the first uplink grant resource, to determine the first logical channel.

For example, the correspondence between the logical channel configured by the network device and the scheduling periodicity parameter is shown in Table 5, and the correspondence between the uplink grant resource and the uplink scheduling parameter is shown in Table 3 or Table 4. The index of the first uplink grant resource may be the UL grant config index 1, the scheduling periodicity corresponding to the index of the first uplink grant resource is $P_{m+1}$, and the MAC layer determines that the maximum scheduling periodicity $P_1$ of the LCH 1 is greater than $P_{m+1}$, so that the MAC layer may determine that a scheduling periodicity parameter of the LCH 1 satisfies a scheduling periodicity requirement of the first uplink grant resource.

Optionally, after determining that the minimum repetition quantity of the LCH 1 does not satisfy the repetition quantity requirement of the first uplink grant resource, but the maximum scheduling periodicity satisfies the scheduling periodicity requirement of the first uplink grant resource, the MAC layer may determine that the LCH 1 is an inappropriate logical channel.

For another example, if the MAC layer determines that the maximum scheduling periodicity $P_2$ of the LCH 2 is greater than $P_{m+1}$, the MAC layer may determine that a scheduling periodicity parameter of the LCH 2 satisfies the scheduling periodicity requirement of the first uplink grant resource.

Optionally, after determining that the minimum repetition quantity of the LCH 2 satisfies the repetition quantity requirement of the first uplink grant resource, and the maximum scheduling periodicity satisfies the scheduling periodicity requirement of the first uplink grant resource, the MAC layer may determine that the LCH 2 is an appropriate logical channel.

For another example, if the MAC layer determines that the maximum scheduling periodicity $P_3$ of the LCH 3 is equal to $P_{m+1}$, the MAC layer may determine that a scheduling periodicity parameter of the LCH 3 also satisfies the scheduling periodicity requirement of the first uplink grant resource.

It should be understood that, in this embodiment of this application, that the first logical channel is a logical channel whose scheduling periodicity parameter satisfies the scheduling periodicity requirement of the first uplink grant resource may also be understood as that the maximum scheduling periodicity of the first logical channel is greater than the scheduling periodicity of the first uplink grant resource.

Optionally, the parameter B includes the scheduling periodicity parameter of the one or more logical channels, and the scheduling periodicity parameter includes one or more scheduling periodicities.

Table 6 shows correspondences between the index of the logical channel, the repetition quantity, and the scheduling periodicity.

TABLE 6

Correspondences between the index of the logical channel, the repetition quantity, and the scheduling periodicity

| Index of the logical channel | Uplink scheduling parameters | |
|---|---|---|
| | Repetition quantity | Scheduling periodicity |
| LCH 1 | $K_1, K_2, K_3$ | $P_1, P_2, P_3$ |
| LCH 2 | $K_4, K_5$ | $P_4, P_5$ |
| . . . | . . . | . . . |
| LCH m | $K_7, K_8$ | $P_7, P_8$ |

It should be understood that when the scheduling periodicity parameter includes one or more scheduling periodicities, a process of determining the logical channel whose scheduling periodicity parameter satisfies the scheduling periodicity requirement of the first uplink grant resource is similar to a process of determining that the repetition quantity parameter (including one or more repetition quantities) satisfies the repetition quantity requirement of the first uplink grant resource. For brevity, details are not described herein. Optionally, the parameter B includes the MCS information, the power information, and the frequency hopping information.

Table 7 shows correspondences between the index of the logical channel, the MCS information, the power information, and the frequency hopping information.

TABLE 7

Correspondences between the index of the logical channel, the MCS information, the power information, and the frequency hopping information

| Index of the logical channel | Uplink scheduling parameters | | |
|---|---|---|---|
| | MCS information | Power information | Frequency hopping information |
| LCH 1 | MCS table 3/MCS index 3 | Power offset #3 | Enabled (enabled) |
| LCH 2 | MCS table 4/MCS index 4 | Power offset #3 | Disabled (disabled) |
| . . . | . . . | . . . | . . . |
| LCH m | MCS table 7/MCS index 7 | Power offset #7 | Disabled (disabled) |

For example, the correspondences between the logical channel configured by the network device, the MCS information, the power information, and the frequency hopping information are shown in Table 7, and the correspondence between the uplink grant resource and the uplink scheduling parameter is shown in Table 4. The MAC layer may determine that the MCS table 3 corresponding to the LCH 1 is the MCS table 1 of the first uplink grant resource, so that the MAC layer may determine that the MCS information of the LCH 1 satisfies an MCS requirement of the first uplink grant resource.

Alternatively, if the MAC layer determines that the MCS index 3 corresponding to the LCH 1 is the MCS index 1 in the first uplink scheduling parameter, the MAC layer may determine that the MCS information of the LCH 1 satisfies the MCS requirement of the first uplink grant resource.

Alternatively, if the MAC layer determines that a target BLER corresponding to an MCS table corresponding to the LCH 1 is less than or is less than or equal to a target BLER corresponding to an MCS table in the first uplink scheduling parameter, the MAC layer may determine that the MCS information of the LCH 1 satisfies the MCS requirement of the first uplink grant resource.

It should be understood that different MCS tables correspond to different target block error rates, that is, have different reliability standards, and MCS information of the logical channel, the flow, the PPPP, or the PPPR satisfies an MCS requirement of the uplink grant resource, to satisfy reliability requirements of different services.

According to the radio scheduling method in this embodiment of this application, the network device configures the MCS information corresponding to the logical channel, the flow, the PPPP, or the PPPR. This helps ensure that the terminal selects an appropriate logical channel, flow, PPPP, or PPPR, thereby helping satisfy reliability requirements of different services.

For another example, if the MAC layer may determine that the power information power offset #3 corresponding to the LCH 1 is the power offset #1 in the first uplink grant resource, the MAC layer may determine that the power information of the LCH 1 satisfies a power requirement of the first uplink grant resource.

It should be understood that power information of the logical channel, the flow, the PPPP, or the PPPR satisfies a power requirement of the uplink grant resource, to satisfy reliability requirements of different services. High transmit power leads to an increase in a target received signal to noise ratio and a corresponding increase in a decoding success rate.

According to the radio scheduling method in this embodiment of this application, the network device configures the power information corresponding to the logical channel, the flow, the PPPP, or the PPPR. This helps ensure that the terminal selects an appropriate logical channel, flow, PPPP, or PPPR, thereby helping satisfy reliability requirements of different services.

For another example, if the MAC layer may determine that the frequency hopping information corresponding to the LCH 1 is enabled, and the frequency hopping information of the first uplink grant resource is enabled, the MAC layer may determine that the frequency hopping information of the LCH 1 satisfies a frequency hopping requirement of the first uplink grant resource.

It should be understood that frequency hopping information of the logical channel, the flow, the PPPP, or the PPPR satisfies a frequency hopping requirement of the uplink grant resource, to satisfy reliability requirements of different services. In this way, anti-interference and anti-attenuation capabilities of a signal can be improved.

According to the radio scheduling method in this embodiment of this application, the network device configures the frequency hopping information corresponding to the logical channel, the flow, the PPPP, or the PPPR. This helps ensure that the terminal selects an appropriate logical channel, flow, PPPP, or PPPR, thereby helping satisfy reliability requirements of different services.

For another example, the MAC layer may determine an amount of to-be-sent data on the LCH 1, for example, a size of a radio link control layer protocol data unit (RLC PDU) or a size of a media access control layer protocol data unit (MAC PDU) including a MAC subheader. A TBS of the first uplink grant resource is relatively close to or equal to a data packet size of the to-be-sent data on the LCH 1. For example, the TBS of the first uplink grant resource is 100 bits, the amount of the to-be-sent data on the LCH 1 is 100 bits, and an amount of to-be-sent data on the LCH 2 is 200 bits, so that the MAC layer may determine that the amount of the to-be-sent data on the LCH 1 satisfies a TBS requirement of the first uplink grant resource.

Optionally, when the terminal has a plurality of uplink grant resources that can be used at the same time, or sending duration of PUSCHs corresponding to the plurality of uplink grant resources overlaps or partially overlaps, if the terminal can use only one uplink grant resource for sending, the terminal may consider selecting, by using an amount of to-be-sent data sent on the uplink grant resource, an uplink grant resource with a most matching TBS for sending.

It should be understood that TBS information of the logical channel, the flow, the PPPP, or the PPPR satisfies a TBS requirement of the uplink grant resource, to satisfy different data packet sizes of different services, thereby maximizing resource utilization.

It should be understood that Table 5, Table 6, and Table 7 are merely examples. Alternatively, Table 5 and Table 7 may be combined, or Table 6 and Table 7 may be combined, or a portion of information in Table 5, Table 6, and Table 7 may be selected for combination. For example, the network device may configure correspondences between the logical channel, the repetition quantity parameter, and the MCS information, or the network device may configure correspondences between the logical channel, the repetition quantity parameter, the scheduling periodicity parameter, and the power information. This embodiment of this application is not limited to the foregoing examples.

It should be understood that, in the foregoing examples, the MAC may determine whether an LCH is an appropriate LCH with reference to only the repetition quantity, or with reference to the repetition quantity and one or more parameters in the parameter B, or with reference to only one or more parameters in the parameter B. This embodiment of this application is not limited to the foregoing examples.

S340: The terminal sends service data of the first logical channel to the network device by using the first uplink grant resource.

For example, the network device configures a UL grant (for example, a UL grant 1 whose corresponding index is the UL grant config index 1), and the MAC layer of the terminal may determine an appropriate logical channel (for example, the LCH 1) based on an uplink scheduling parameter of the UL grant 1 and the uplink scheduling parameter (including the parameter A, and optionally further including the parameter B) of the logical channel. The terminal may use the UL grant 1 to send data on the LCH 1.

For another example, the network device configures one or more UL grants (for example, a UL grant 1 whose corresponding index is the UL grant config index 1), and the MAC layer of the terminal may determine a plurality of appropriate logical channels (for example, the LCH 1 and the LCH 2) based on an uplink scheduling parameter of the UL grant 1 and the uplink scheduling parameter (including the parameter A, and optionally further including the parameter B) of the logical channel. The terminal may use the UL grant 1 to send data on the LCH 1 and the LCH 2.

It should be understood that, after determining a plurality of logical channels as appropriate logical channels, the terminal may allocate resources based on priorities of the logical channels, and send data of the plurality of logical channels.

For another example, the network device configures a plurality of UL grants (for example, a UL grant 1 and a UL grant 2), and the MAC layer of the terminal may determine an appropriate logical channel (for example, the LCH 1) based on an uplink scheduling parameter of the UL grant 1 and the uplink scheduling parameter (including the parameter A, and optionally further including the parameter B) of the logical channel. However, no appropriate logical channel is determined based on an uplink scheduling parameter of the UL grant 2 and the uplink scheduling parameter (including the parameter A, and optionally further including the parameter B) of the logical channel, so that the terminal may use the UL grant 1 to send data on the LCH 1.

According to the radio scheduling method in this embodiment of this application, a correspondence between the logical channel, the flow, the PPPP, or the PPPR and the repetition quantity or the parameter B is configured, to help the terminal select an appropriate logical channel, flow, PPPP, or PPPR to transmit service data. In this way, reliability and latency requirements of different service data are ensured.

The radio scheduling method in this embodiment of this application is described in detail above with reference to FIG. 5. In the method 300, the network device may configure one or more uplink grant resources, and the terminal may determine an appropriate logical channel, flow, PPPP, or PPPR by using the uplink scheduling parameter of the uplink grant resource and the uplink scheduling parameter (including the parameter A, and optionally further including the parameter B) corresponding to the logical channel, and use the uplink grant resource to send data on the logical channel, the flow, the PPPP, or the PPPR.

Figure 6:
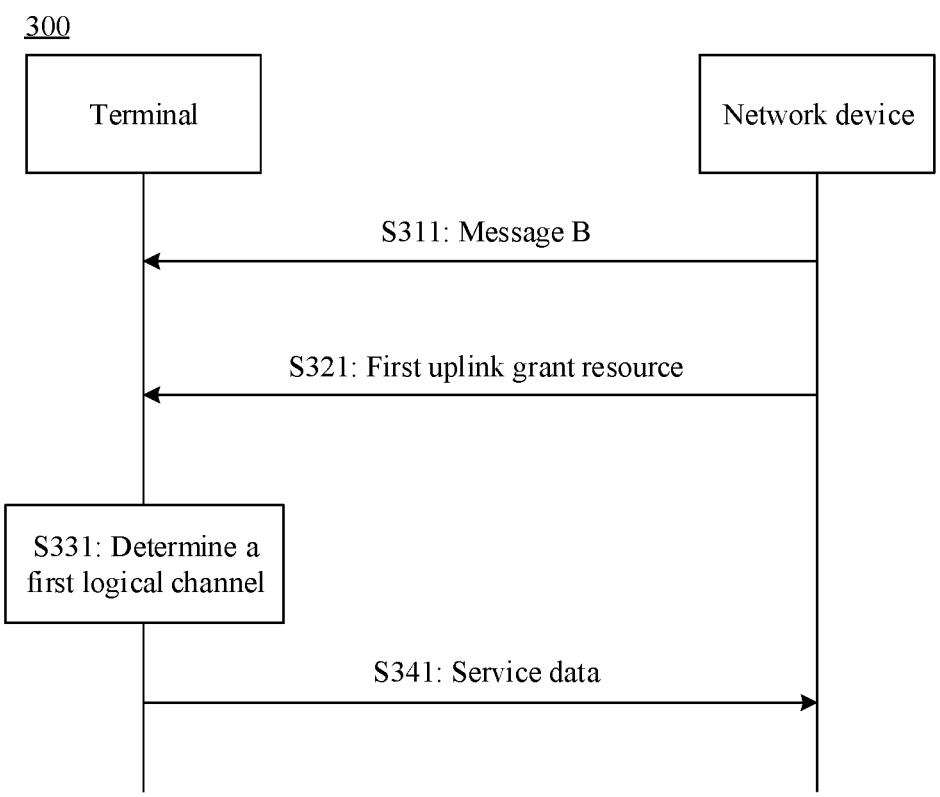
FIG. 6 is another schematic flowchart of a radio scheduling method according to an embodiment of this application.

The following describes another radio scheduling method according to an embodiment of this application with reference to FIG. 6. In the method, a case in which a network device configures a plurality of uplink grant resources is used as an example for description. In the case, the terminal may use a plurality of uplink grant resources.

FIG. 6 is another schematic flowchart of a radio scheduling method 300 according to an embodiment of this application. As shown in FIG. 6, an execution body of the method 300 may be a radio scheduling apparatus (for example, a terminal or a chip or an apparatus used in a terminal). The method 300 includes the following steps.

S311: The terminal receives a message B from a network device, where the message B is used to configure one or more logical channels, the message B includes a parameter A, and the parameter A includes a repetition quantity parameter of each of the one or more logical channels.

It should be understood that a process of S311 is similar to that of S310. For brevity, details are not described herein again.

S321: The terminal obtains a first uplink grant resource from the network device.

Optionally, the obtaining, by the terminal, a first uplink grant resource from the network device includes:

The terminal receives a plurality of uplink grant resources from the network device.

The terminal obtains the first uplink grant resource from the plurality of uplink grant resources.

Optionally, the receiving, by the terminal, a plurality of uplink grant resources from the network device includes:

The terminal receives DCI from the network device, where the DCI indicates the plurality of uplink grant resources.

Optionally, the receiving, by the terminal, a plurality of uplink grant resources from the network device includes:

The terminal receives an RAR from the network device, where the RAR indicates the plurality of uplink grant resources.

Optionally, the receiving, by the terminal, a plurality of uplink grant resources from the network device includes:

The terminal receives a configuration message from the network device, where the configuration message indicates the plurality of uplink grant resources.

Optionally, the configuration message may indicate start positions of a plurality of preconfigured uplink grant resources. For example, a start time domain position of one of the preconfigured uplink grant resources is used as a reference start position, the configuration message indicates an offset of one or more time domain positions, and a start time domain position of the second preconfigured uplink grant resource is the reference start position+an offset 1. By analogy, the terminal determines start positions of a plurality of uplink grant resources.

Optionally, the receiving, by the terminal, a plurality of uplink grant resources from the network device includes:

The terminal receives a configuration message and DCI from the network device, where the configuration message includes configuration parameters of the plurality of uplink grant resources, and the DCI indicates the plurality of uplink grant resources.

Optionally, the DCI may further indicate an index of an activated uplink grant resource. For example, 001 indicates to activate an uplink grant resource index #1, and 010 indicates to activate an uplink grant resource index #2. For another example, the index may be in a form of a bitmap, and each bit indicates a corresponding uplink grant resource, for example, the first bit indicates an uplink grant resource index #1, the second bit indicates an uplink grant resource index #2, and the third bit indicates an uplink grant resource index #3, so that 001 indicates to activate an uplink grant resource index #1, and 011 indicates to activate both the uplink grant resource index #1 and an uplink grant resource index #2.

Optionally, the DCI may further indicate start positions of a plurality of preconfigured uplink grant resources. For example, a start time domain position of one of the preconfigured uplink grant resources is used as a reference start position, the DCI indicates an offset of one or more time domain positions, and a start time domain position of the second preconfigured uplink grant resource is the reference start position+an offset 1. By analogy, the terminal determines start positions of a plurality of uplink grant resources.

It should be understood that, in this embodiment of this application, the plurality of uplink grant resources may be all dynamic uplink grant resources, or may be all preconfigured uplink grant resources, or the plurality of uplink grant resources may include a preconfigured uplink grant resource and a dynamic uplink grant resource. This is not limited in this embodiment of this application.

S331: The terminal determines a first logical channel based on a repetition quantity of the first uplink grant resource and the repetition quantity parameter of the one or more logical channels, and the first logical channel is a logical channel whose repetition quantity parameter satisfies a repetition quantity requirement of the first uplink grant resource.

It should be understood that a process in which the terminal determines an appropriate logical channel based on an uplink scheduling parameter of the uplink grant resource and a correspondence between the logical channel and the uplink scheduling parameter (including the parameter A, and optionally further including a parameter B) is similar to the process in S330. For brevity, details are not described herein again.

It should be further understood that, in S330, the network device may configure one or more uplink grant resources, and the terminal may use one of the uplink grant resources; and in S331, the network device may configure a plurality of uplink grant resources, and the terminal may send data by using the plurality of uplink grant resources.

For example, the network device configures a UL grant 1 and a UL grant 2, and a MAC layer of the terminal may determine an LCH 1 as an appropriate logical channel by using an uplink scheduling parameter of the UL grant 1 and the uplink scheduling parameter corresponding to the logical channel. In addition, the MAC layer of the terminal may also determine the LCH 1 as an appropriate logical channel by using an uplink scheduling parameter of the UL grant 2 and the uplink scheduling parameter corresponding to the logical channel. In this case, the terminal may use both the uplink grant resources: the UL grant 1 and the UL grant 2.

For another example, the network device configures a UL grant 1 and a UL grant 2, and a MAC layer of the terminal may determine an LCH 1 as an appropriate logical channel by using an uplink scheduling parameter of the UL grant 1 and the uplink scheduling parameter corresponding to the logical channel. In addition, the MAC layer of the terminal may also determine an LCH 2 as an appropriate logical channel by using an uplink scheduling parameter of the UL grant 2 and the uplink scheduling parameter corresponding to the logical channel. In this case, the terminal may use both the uplink grant resources: the UL grant 1 and the UL grant 2.

S341: The terminal sends service data of the first logical channel to the network device by using the first uplink grant resource.

Optionally, when the terminal may use the plurality of uplink grant resources, the method 300 further includes:

The terminal determines the first uplink grant resource from the plurality of uplink grant resources that can be used.

Optionally, when the terminal has a plurality of uplink grant resources that can be used at the same time, or sending duration of physical uplink shared channels (PUSCH) corresponding to the plurality of uplink grant resources at least partially overlaps, if the terminal can use only one uplink grant resource for sending, the terminal may consider selecting an uplink grant resource with a maximum repetition quantity for sending. If the plurality of uplink grant resources have a same repetition quantity, the terminal may autonomously select one of the plurality of uplink grant resources or select an uplink grant resource with a shortest scheduling periodicity to send data, and the uplink grant resource is the first uplink grant resource.

Optionally, when the terminal has a plurality of uplink grant resources that can be used at the same time, or sending duration of PUSCHs corresponding to the plurality of uplink grant resources at least partially overlaps, if the terminal can use only one uplink grant resource for sending, the terminal can select an uplink grant resource with a shortest scheduling periodicity for sending. If the plurality of uplink grant resources have a same scheduling periodicity, the terminal may autonomously select one of the plurality of uplink grant resources or select an uplink grant resource with a maximum repetition quantity to send data, and the uplink grant resource is the first uplink grant resource.

Optionally, when the terminal has a plurality of uplink grant resources that can be used at the same time, or sending duration of PUSCHs corresponding to the plurality of uplink grant resources at least partially overlaps, if the terminal can use only one uplink grant resource for sending, the terminal may determine the first uplink grant resource based on MCS information of the plurality of uplink grant resources. The first uplink grant resource is an uplink grant resource that uses an MCS table with a lower target block error rate, or the first uplink grant resource is an uplink grant resource that uses an MCS index with a lower corresponding modulation level. If the plurality of uplink grant resources have same MCS information, the terminal may autonomously select one of the plurality of uplink grant resources or select an uplink grant resource with a maximum repetition quantity to send data, and the uplink grant resource is the first uplink grant resource.

Optionally, when the terminal has a plurality of uplink grant resources that can be used at the same time, or sending duration of PUSCHs corresponding to the plurality of uplink grant resources at least partially overlaps, if the terminal can use only one uplink grant resource for sending, the terminal may determine the first uplink grant resource based on power information of the plurality of uplink grant resources. The first uplink grant resource is an uplink grant resource that uses higher transmit power. If the plurality of uplink grant resources have same power information, the terminal may autonomously select one of the plurality of uplink grant resources or select an uplink grant resource with a maximum repetition quantity to send data, and the uplink grant resource is the first uplink grant resource.

Optionally, when the terminal has a plurality of uplink grant resources that can be used at the same time, or sending duration of PUSCHs corresponding to the plurality of uplink grant resources at least partially overlaps, if the terminal can use only one uplink grant resource for sending, the terminal may determine the first uplink grant resource based on frequency hopping information of the plurality of uplink grant resources. The first uplink grant resource is an uplink grant resource on which frequency hopping is enabled. If the plurality of uplink grant resources have same frequency hopping information, the terminal may autonomously select one of the plurality of uplink grant resources or select an uplink grant resource with a maximum repetition quantity to send data, and the uplink grant resource is the first uplink grant resource.

Optionally, when the terminal has a plurality of uplink grant resources that can be used at the same time, or sending duration of PUSCHs corresponding to the plurality of uplink grant resources at least partially overlaps, if the terminal can use only one uplink grant resource for sending, the terminal may select an uplink grant resource indicated by the RAR for sending, that is, the terminal cannot use a preconfigured uplink grant resource.

Optionally, when the terminal has a plurality of uplink grant resources that can be used at the same time, the plurality of uplink grant resources include a preconfigured uplink grant resource and an uplink grant resource indicated by the RAR, and sending duration of a PUSCH of the preconfigured uplink grant resource does not overlap sending duration of a PUSCH of the uplink grant resource indicated by the RAR, the terminal may use the preconfigured uplink grant resource, or may use the uplink grant resource indicated by the RAR.

It should be understood that, when the terminal has a plurality of uplink grant resources that can be used at the same time and the plurality of uplink grant resources are the plurality of uplink grant resources indicated by the RAR, if sending duration of PUSCHs corresponding to the plurality of uplink grant resources does not overlap, the terminal may use the plurality of uplink grant resources, or select one uplink grant resource from the plurality of uplink grant resources to send data. A manner of determining one uplink grant resource from the plurality of uplink grant resources indicated by the RAR may be the same as the foregoing determining manner, or may be another determining manner.

It should be further understood that, when the terminal has a plurality of uplink grant resources that can be used at the same time and the plurality of uplink grant resources are the plurality of uplink grant resources indicated by the RAR, if sending duration of PUSCHs corresponding to the plurality of uplink grant resources partially overlaps, the terminal may select the first uplink resource by using any one of the foregoing methods.

Optionally, when the terminal has a plurality of uplink grant resources that can be used at the same time, or sending duration of PUSCHs corresponding to the plurality of uplink grant resources at least partially overlaps, if the terminal can use only one uplink grant resource for sending, the terminal may select, based on a first logical channel selected for each of the plurality of uplink grant resources, an uplink grant resource corresponding to a highest logical channel priority or a highest logical channel group priority, and the uplink grant resource is the first uplink grant resource.

It should be understood that, in this embodiment of this application, if the terminal has a plurality of uplink grant resources that can be used at the same time, a manner in which the terminal determines the first uplink grant resource from the plurality of uplink grant resources is not limited to the foregoing examples, and the first uplink grant resource may alternatively be determined in another manner. This is not limited in this application.

It should be further understood that, in this embodiment of this application, if the terminal has a plurality of uplink grant resources that can be used at the same time, the terminal may also send data by using at least two of the plurality of uplink grant resources.

For example, in the scenario shown in FIG. 1, the RAN 110 may configure the parameter A (optionally further including the parameter B) of the logical channel and the first uplink grant resource for the terminal 130, and the terminal 130 may determine an appropriate logical channel, and use the first uplink grant resource to send service data of the logical channel to the RAN 110.

Figure 7:
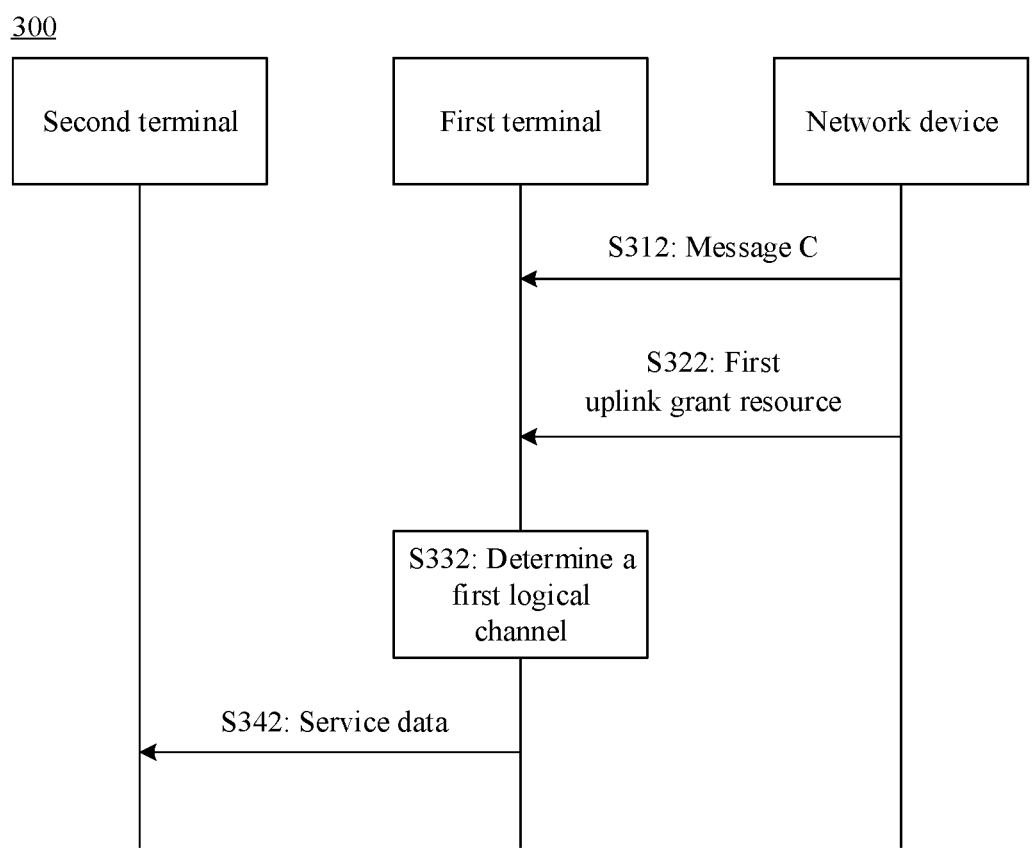
FIG. 7 is another schematic flowchart of a radio scheduling method according to an embodiment of this application.

FIG. 7 is another schematic flowchart of a radio scheduling method 300 according to an embodiment of this application. As shown in FIG. 7, the method 300 includes the following steps.

S312: A first terminal receives a message C from a network device, where the message C is used to configure one or more logical channels, the message C includes a parameter A, and the parameter A includes a repetition quantity parameter of each of the one or more logical channels.

S322: The first terminal obtains a first uplink grant resource from the network device.

S332: The first terminal determines a first logical channel based on a repetition quantity of the first uplink grant resource and the repetition quantity parameter of the one or more logical channels, and the first logical channel is a logical channel whose repetition quantity parameter satisfies a repetition quantity requirement of the first uplink grant resource.

It should be understood that a process of S312 to S332 is similar to that of S310 to S330, or a process of S312 to S332 is similar to that of S311 to S331. For brevity, details are not described herein again.

S342: The first terminal sends service data of the first logical channel to a second terminal by using the first uplink grant resource.

It should be understood that the terminal may send data to the network device in S340 and S341, and the terminal may send data to another terminal in S342.

It should be further understood that the methods shown in FIG. 5 and FIG. 6 may be applied to the scenario 1 shown in FIG. 1, and the method shown in FIG. 7 may be applied to the scenario 2 shown in FIG. 2.

For example, in the scenario shown in FIG. 2, the RAN 210 may configure, through the Uu interface, the parameter A (optionally further including a parameter B) of the logical channel and the first uplink grant resource for the terminal 220, and the terminal 220 may determine an appropriate logical channel, and use the first uplink grant resource to send, through the PC5 interface, service data of the logical channel to the terminal 230.

According to the radio scheduling method in this embodiment of this application, a correspondence between the logical channel, a flow, a PPPP, or a PPPR and the parameter A and/or the parameter B is configured, to help the terminal select an appropriate logical channel, flow, PPPP, or PPPR to transmit service data. In this way, reliability and latency requirements of different service data are ensured.

Figure 8:
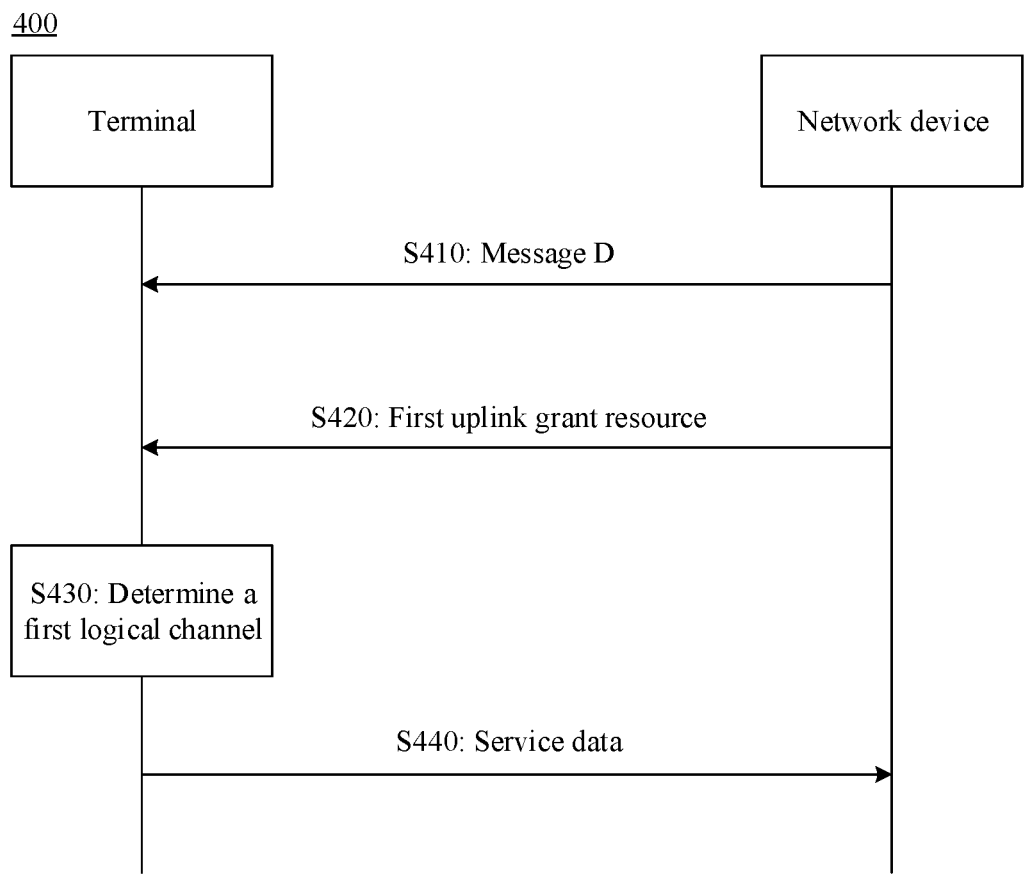
FIG. 8 is another schematic flowchart of a radio scheduling method according to an embodiment of this application.

FIG. 8 is a schematic flowchart of a radio scheduling method 400 according to an embodiment of this application. As shown in FIG. 8, an execution body of the method 400 may be a radio scheduling apparatus (for example, a terminal or a chip or an apparatus used in a terminal). The method 400 includes the following steps.

S410: The terminal receives a message D from a network device, where the message D is used to configure one or more logical channels, the message D includes a parameter C, and the parameter C includes an index of an uplink grant resource corresponding to each of the one or more logical channels.

For example, the network device may configure one or more appropriate uplink grant resources for each of the one or more logical channels, and send an index of the configured one or more uplink grant resources to the terminal through the message D.

Table 8 shows a correspondence between an index of the logical channel and the index of the uplink grant resource.

TABLE 8

Correspondence between the index of the logical channel and the index of the uplink grant resource

| Index of the logical channel | Index of the uplink grant resource |
|---|---|
| LCH 1 | UL grant config {index 1, index 2} |
| LCH 2 | UL grant config {index 3, index 4} |
| . . . | . . . |
| LCH m | UL grant config {index 7} |

It should be understood that, in this embodiment of this application, a manner in which the network device determines the correspondence between the index of the logical channel and the index of the uplink grant resource may be similar to the determining manner in the method 300. The network device may determine the index of the one or more uplink grant resources corresponding to each logical channel based on one or more of a maximum repetition quantity parameter, a minimum scheduling periodicity parameter, MCS information, power information, and frequency hopping information of each logical channel, and one or more of a repetition quantity, a scheduling periodicity, MCS information, power information, and frequency hopping information of each of the plurality of uplink grant resources. A specific determining manner may be similar to the determining manner of the MAC layer of the terminal in the method 300. For brevity, details are not described herein again.

S420: The terminal obtains a first uplink grant resource from the network device.

Optionally, the obtaining, by the terminal, a first uplink grant resource from the network device includes:

The terminal device receives a plurality of uplink grant resources from the network device.

The terminal obtains the first uplink grant resource from the plurality of uplink grant resources.

S430: The terminal determines a first logical channel based on an index of the first uplink grant resource and the parameter C, and an index of one or more uplink grant resources corresponding to the first logical channel includes the index of the first uplink grant resource.

For example, after the terminal receives the parameter C and the first uplink grant resource, a PHY layer may indicate the index of the first uplink grant resource to a MAC layer. Optionally, the index of the first uplink grant resource may be included in sent uplink information indicated by the physical layer to the MAC layer. After receiving the uplink information, the MAC determines the index of the first uplink grant resource, and then determines an appropriate logical channel based on the parameter C.

For example, the index corresponding to the first uplink grant resource is the UL grant config index 3, and the MAC layer may determine that the LCH 2 is an appropriate logical channel through the correspondence between the index of the logical channel and the index of the uplink grant resource shown in Table 8.

S440: The terminal sends service data of the first logical channel to the network device by using the first uplink grant resource.

Optionally, the plurality of uplink grant resources include an uplink grant resource indicated by a random access response RAR and a preconfigured uplink grant resource, and the first uplink grant resource is the uplink grant resource indicated by the RAR.

Optionally, the first uplink grant resource is an uplink grant resource whose repetition quantity satisfies a condition.

It should be understood that, when the terminal has a plurality of uplink grant resources that can be used, the terminal may determine the first uplink grant resource from the plurality of uplink grant resources that can be used, and this determining manner is the same as the method in the method 300. For brevity, details are not described herein again.

For example, in the scenario shown in FIG. 1, the RAN 110 may configure the index of the uplink grant resource corresponding to the logical channel and the first uplink grant resource for the terminal 130, and the terminal 130 may determine an appropriate logical channel, and use the first uplink grant resource to send service data of the logical channel to the RAN 110.

Figure 9:
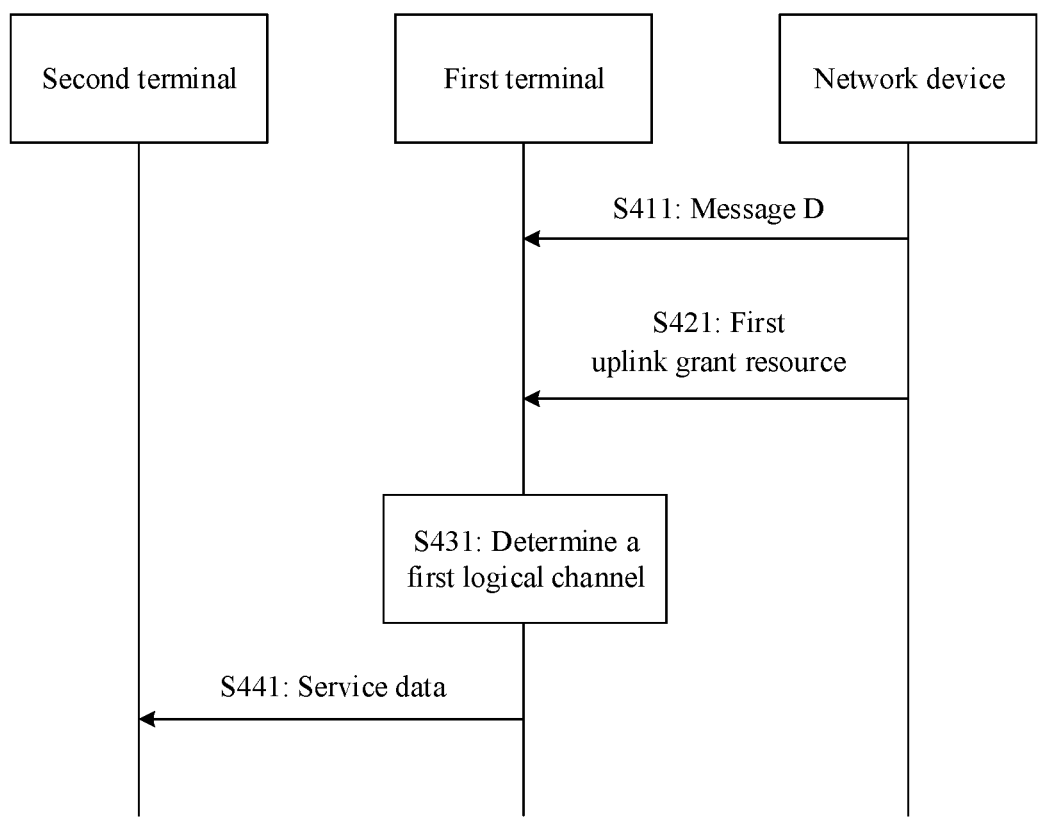
FIG. 9 is another schematic flowchart of a radio scheduling method according to an embodiment of this application.

FIG. 9 is another schematic flowchart of a radio scheduling method 400 according to an embodiment of this application. As shown in FIG. 9, the method 400 includes the following steps.

S411: A first terminal receives a message D from a network device, where the message D is used to configure one or more logical channels, the message D includes a parameter C, and the parameter C includes an index of an uplink grant resource corresponding to each of the one or more logical channels.

S421: The first terminal obtains a first uplink grant resource from the network device.

S431: The first terminal determines a first logical channel based on an index of the first uplink grant resource and the parameter C, and an index of one or more uplink grant resources corresponding to the first logical channel includes the index of the first uplink grant resource.

It should be understood that S411 to S431 are similar to S410 to S430. For brevity, details are not described herein again.

S441: The first terminal sends service data of the first logical channel to a second terminal by using the first uplink grant resource.

For example, in the scenario shown in FIG. 2, the RAN 210 may configure, through the Uu interface, the index of the uplink grant resource corresponding to the logical channel and the first uplink grant resource for the terminal 220, and the terminal 220 may determine an appropriate logical channel, and use the first uplink grant resource to send, through the PC5 interface, service data of the logical channel to the terminal 230.

According to the radio scheduling method in this embodiment of this application, the network device directly configures a relationship between the logical channel, a flow, a PPPP, or a PPPR and the index of the uplink grant resource, to help the terminal select an appropriate logical channel, flow, PPPP, or PPPR to transmit service data. In this way, reliability and latency requirements of different service data are ensured, and overheads of selecting a logical channel by the terminal can also be reduced.

Figure 10:
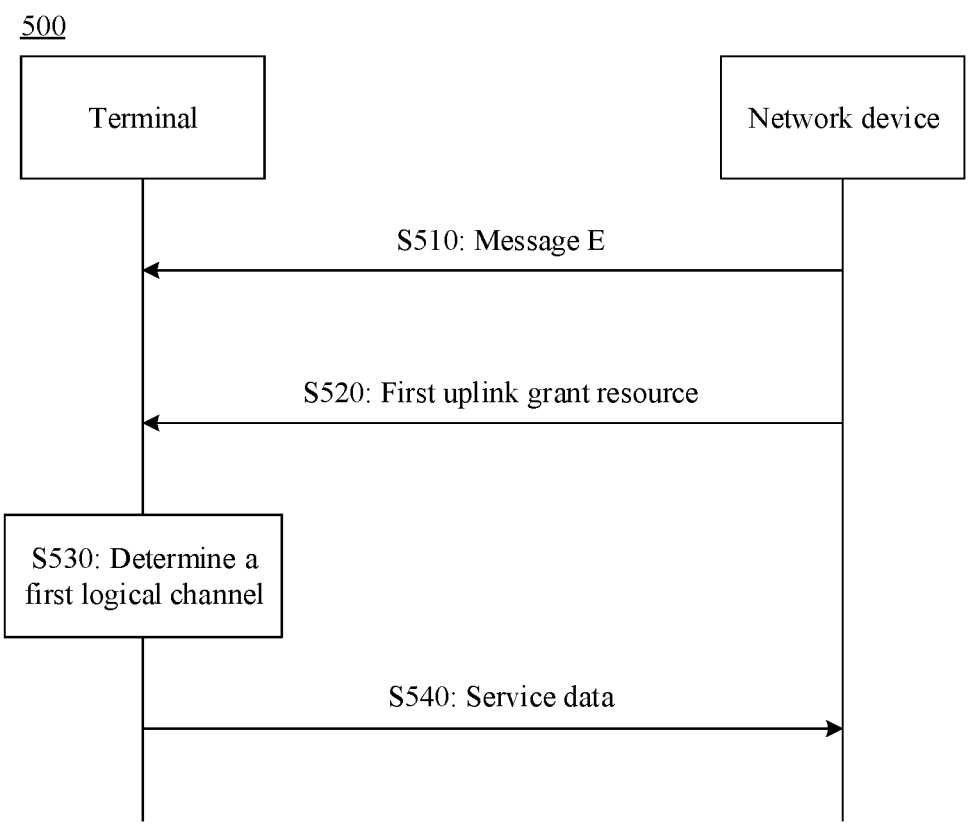
FIG. 10 is another schematic flowchart of a radio scheduling method according to an embodiment of this application.

FIG. 10 is a schematic flowchart of a radio scheduling method 500 according to an embodiment of this application. As shown in FIG. 10, an execution body of the method 500 may be a radio scheduling apparatus (for example, a terminal or a chip or an apparatus used in a terminal). The method 500 includes the following steps.

S510: The terminal receives a message E from a network device, where the message E is used to configure one or more logical channels, the message E includes a parameter D, and the parameter D includes an index of a bandwidth part group (bandwidth part group, BWP group) corresponding to each of the one or more logical channels.

For example, the network device may configure one or more appropriate bandwidth part groups for each of the one or more logical channels, and send an index of the configured one or more bandwidth part groups to the terminal through the message E.

Table 9 shows a correspondence between an index of the logical channel and the index of the bandwidth part group.

TABLE 9

Correspondence between the index of the logical channel and the index of the bandwidth part group

| Index of the logical channel | Index of the bandwidth part group |
|---|---|
| LCH 1 | BWP group {index 1, index 2, index 3} |
| LCH 2 | BWP group {index 4, index 5} |
| . . . | . . . |
| LCH m | BWP group {index 8} |

In this embodiment of this application, the network device may configure a plurality of uplink grant resources. The plurality of uplink grant resources may belong to a same bandwidth part group, or may belong to different bandwidth part groups. The uplink grant resources may be grouped in the following two manners. The BWP group index 1 is used as an example for description.

Manner 1

An uplink grant resource whose repetition quantity is $K_1$ is placed in the BWP group index 1, or an uplink grant resource whose repetition quantity is $K_1$ and whose scheduling periodicity is $P_1$ is placed in the BWP group index 1.

It should be understood that uplink grant resources with same MCS information, power information, and frequency hopping information may alternatively be placed in the BWP group index 1.

Manner 2

Uplink grant resources with different repetition quantities may be placed in the BWP group index 1, or uplink grant resources with different scheduling periodicities may be placed in the BWP group index 1.

For example, the BWP group index 1 includes a UL grant config index 1 and a UL grant config index 2, a repetition quantity of the UL grant config index 1 is $K_1$ and a scheduling periodicity of the UL grant config index 1 is $P_1$, and a repetition quantity of the UL grant config index 2 is $K_2$ and a scheduling periodicity of the UL grant config index 2 is $P_2$.

It should be understood that, in this embodiment of this application, a manner in which the network device determines the correspondence between the index of the logical channel and the bandwidth part group may be similar to the determining manner in the method 300. The network device may determine an index of one or more uplink grant resources corresponding to each logical channel based on one or more of a maximum repetition quantity parameter, a minimum scheduling periodicity parameter, MCS information, power information, and frequency hopping information of each logical channel, and one or more of a repetition quantity, a scheduling periodicity, MCS information, power information, and frequency hopping information of each of the plurality of uplink grant resources. Then, the one or more uplink grant resources are placed in different bandwidth part groups. For brevity, details are not described herein again.

S520: The terminal obtains a first uplink grant resource from the network device.

Optionally, the obtaining, by the terminal, a first uplink grant resource from the network device includes:

The terminal device receives the plurality of uplink grant resources from the network device.

The terminal obtains the first uplink grant resource from the plurality of uplink grant resources.

S530: The terminal determines a first logical channel based on an index of the first uplink grant resource and the parameter D, and an index of one or more bandwidth part groups corresponding to the first logical channel includes an index of a bandwidth part group corresponding to the first uplink grant resource.

For example, after the terminal receives the parameter D and the first uplink grant resource, a PHY layer may indicate the index of the first uplink grant resource to a MAC layer. Optionally, the index of the first uplink grant resource may be included in uplink information indicated by the PHY layer to the MAC layer. After receiving the uplink information, the MAC determines an index of a bandwidth part group in which the index of the first uplink grant resource is located, and then determines an appropriate logical channel based on the parameter D.

For example, the index corresponding to the first uplink grant resource is a UL grant config index 4, and an index of a bandwidth part group in which the UL grant config index 4 is located is the BWP group index 4. The MAC layer may determine that the LCH 2 is an appropriate logical channel through the correspondence between the index of the logical channel and the index of the bandwidth part group shown in Table 9.

S540: The terminal sends service data of the first logical channel to the network device by using the first uplink grant resource.

Optionally, the plurality of uplink grant resources include an uplink grant resource indicated by a random access response RAR and a preconfigured uplink grant resource, and the first uplink grant resource is the uplink grant resource indicated by the RAR.

Optionally, the first uplink grant resource is an uplink grant resource whose repetition quantity satisfies a condition.

It should be understood that, when the terminal has a plurality of uplink grant resources that can be used, the terminal may determine the first uplink grant resource from the plurality of uplink grant resources that can be used, and this determining manner is the same as the manner in the method 300. For brevity, details are not described herein again.

For example, in the scenario shown in FIG. 1, the RAN 110 may configure the index of the BWP group corresponding to the logical channel and the first uplink grant resource for the terminal 130, and the terminal 130 may determine an appropriate logical channel, and use the first uplink grant resource to send service data of the logical channel to the RAN 110.

Figure 11:
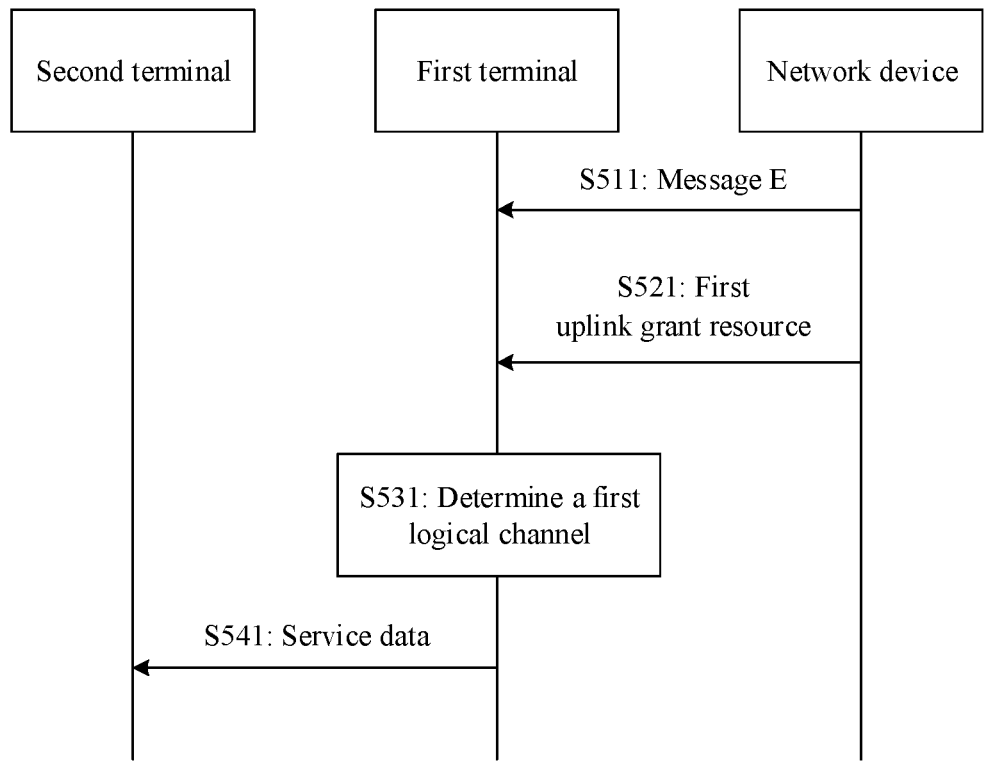
FIG. 11 is another schematic flowchart of a radio scheduling method according to an embodiment of this application.

FIG. 11 is another schematic flowchart of a radio scheduling method 500 according to an embodiment of this application. As shown in FIG. 11, the method 500 includes the following steps.

S511: A first terminal receives a message E from a network device, where the message E is used to configure one or more logical channels, the message E includes a parameter D, and the parameter D includes an index of a BWP group corresponding to each of the one or more logical channels.

S521: The first terminal receives a first uplink grant resource from the network device.

S531: The first terminal determines a first logical channel based on an index of the first uplink grant resource and the parameter D, and an index of one or more bandwidth part groups corresponding to the first logical channel includes an index of a bandwidth part group corresponding to the first uplink grant resource.

It should be understood that S511 to S531 are similar to S510 to S530. For brevity, details are not described herein again.

S541: The first terminal sends service data of the first logical channel to a second terminal by using the first uplink grant resource.

For example, in the scenario shown in FIG. 2, the RAN 210 may configure, through the Uu interface, the index of the BWP group corresponding to the logical channel and the first uplink grant resource for the terminal 220, and the terminal 220 may determine an appropriate logical channel, and use the first uplink grant resource to send, through the PC5 interface, service data of the logical channel to the terminal 230.

According to the radio scheduling method in this embodiment of this application, the network device directly configures a relationship between the logical channel, a flow, a PPPP, or a PPPR and an index of an uplink grant resource, to help the terminal select an appropriate logical channel, flow, PPPP, or PPPR to transmit service data. In this way, reliability and latency requirements of different service data are ensured, and overheads of selecting a logical channel by the terminal can also be reduced.

The radio scheduling methods provided in the embodiments of this application are described in detail above with reference to FIG. 5 to FIG. 11. The following describes in detail the radio scheduling apparatuses provided in the embodiments of this application with reference to the accompanying drawings.

An embodiment of this application further provides an apparatus configured to implement any one of the foregoing methods. For example, an apparatus is provided, including units (or means) configured to implement the steps performed by the terminal in any one of the foregoing methods. For another example, another apparatus is further provided, including units (or means) configured to implement the steps performed by the network device in any one of the foregoing methods.

Figure 12:
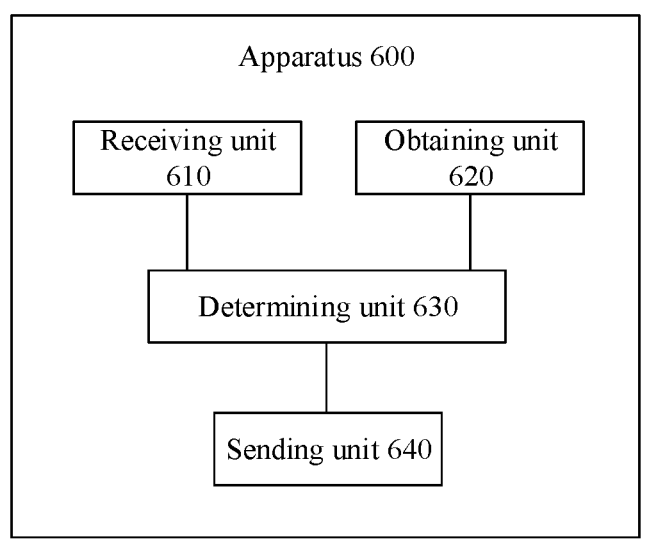
FIG. 12 is a schematic block diagram of a radio scheduling apparatus according to an embodiment of this application.

FIG. 12 is a schematic block diagram of a radio scheduling apparatus 600 according to an embodiment of this application. As shown in FIG. 12, the radio scheduling apparatus 600 may include a receiving unit 610, an obtaining unit 620, a determining unit 630, and a sending unit 640.

In an embodiment, the radio scheduling apparatus may be the terminal in the foregoing method 300 to the method 500, or may be a chip disposed in the terminal.

For example, the receiving unit 610 is configured to receive a first message from a network device. The first message is used to configure a logical channel, the first message includes a first parameter, and the first parameter includes a repetition quantity parameter of the logical channel.

The obtaining unit 620 is configured to receive a first uplink grant resource from the network device.

The determining unit 630 is configured to determine a first logical channel based on a repetition quantity of the first uplink grant resource and the repetition quantity parameter of the logical channel, and the first logical channel is a logical channel whose repetition quantity parameter satisfies a repetition quantity requirement of the first uplink grant resource.

The sending unit 640 is configured to send service data of the first logical channel by using the first uplink grant resource.

Optionally, the repetition quantity parameter includes a minimum repetition quantity, and a minimum repetition quantity of the first logical channel is less than or equal to the repetition quantity of the first uplink grant resource.

Optionally, the repetition quantity parameter includes one or more repetition quantities, and the repetition quantity parameter of the first logical channel includes the repetition quantity of the first uplink grant resource.

Optionally, the first message further includes a second parameter, and the second parameter includes at least one of a scheduling periodicity parameter, a modulation and coding scheme parameter, power information, or frequency hopping information of the logical channel.

Optionally, the first logical channel is a logical channel whose repetition quantity parameter satisfies the repetition quantity requirement of the first uplink grant resource and for which the second parameter satisfies a parameter requirement corresponding to the first uplink grant resource.

Optionally, the second parameter includes the scheduling periodicity parameter, the scheduling periodicity parameter includes a maximum scheduling periodicity, and a maximum scheduling periodicity of the first logical channel is greater than or equal to a scheduling periodicity of the first uplink grant resource.

Optionally, the second parameter includes the scheduling periodicity parameter, the scheduling periodicity parameter includes one or more scheduling periodicities, and a scheduling periodicity parameter of the first logical channel includes a scheduling periodicity of the first uplink grant resource.

Optionally, the receiving unit 610 is further configured to receive a plurality of uplink grant resources from the network device.

The obtaining unit 620 is specifically configured to obtain the first uplink grant resource from the plurality of uplink grant resources.

Optionally, the plurality of uplink grant resources include an uplink grant resource indicated by a random access response RAR and a preconfigured uplink grant resource, and the first uplink grant resource is the uplink grant resource indicated by the RAR.

Optionally, the first uplink grant resource is an uplink grant resource whose repetition quantity satisfies a condition.

Optionally, the receiving unit 610 is specifically configured to:
receive downlink control information DCI from the network device, where the DCI indicates the uplink grant resource; or
receive a random access response RAR from the network device, where the RAR indicates the uplink grant resource; or
receive a configuration message from the network device, where the configuration message indicates the uplink grant resource; or
receive a configuration message and DCI sent by the network device, where the configuration message includes a configuration parameter of the uplink grant resource, and the DCI indicates the plurality of uplink grant resources.

It should be understood that the radio scheduling apparatus 600 may correspond to the terminal in the radio scheduling method 300 according to the embodiments of this application, and the radio scheduling apparatus 600 may include units configured to perform the method performed by the terminal in the radio scheduling method 300. In addition, the units in the radio scheduling apparatus 600 and the foregoing other operations and/or functions are separately used to implement corresponding procedures of the radio scheduling method 300. For a specific process of performing the foregoing corresponding steps by the units, refer to the foregoing descriptions with reference to the method embodiments in FIG. 5 to FIG. 7. For brevity, details are not described herein.

In another embodiment, the receiving unit 610 is configured to receive a first message from a network device. The first message is used to configure a logical channel, the first message includes a first parameter, and the first parameter includes an index of an uplink grant resource corresponding to the logical channel.

The obtaining unit 620 is further configured to obtain a first uplink grant resource from the network device.

The determining unit 630 is configured to determine a first logical channel based on an index of the first uplink grant resource and the first parameter, and an index of an uplink grant resource corresponding to the first logical channel includes the index of the first uplink grant resource.

The sending unit 640 is configured to send service data of the first logical channel by using the first uplink grant resource.

It should be understood that the radio scheduling apparatus 600 may also correspond to the terminal in the radio scheduling method 400 according to the embodiments of this application, and the radio scheduling apparatus 600 may include units configured to perform the method performed by the terminal in the radio scheduling method 400. In addition, the units in the radio scheduling apparatus 600 and the foregoing other operations and/or functions are separately used to implement corresponding procedures of the radio scheduling method 400. For a specific process of performing the foregoing corresponding steps by the units, refer to the foregoing descriptions with reference to the method embodiments in FIG. 8 and FIG. 9. For brevity, details are not described herein.

In another embodiment, the receiving unit 610 is configured to receive a first message from a network device. The first message is used to configure a logical channel, the first message includes a first parameter, and the first parameter includes an index of a bandwidth part group corresponding to the logical channel.

The obtaining unit 620 is configured to obtain a first uplink grant resource from the network device.

The determining unit 630 is configured to determine a first logical channel based on an index of the first uplink grant resource and the first parameter, and an index of a bandwidth part group corresponding to the first logical channel includes an index of a bandwidth part group corresponding to the first uplink grant resource.

The sending unit 640 is further configured to send service data of the first logical channel by using the first uplink grant resource.

It should be understood that the radio scheduling apparatus 600 may further correspond to the terminal in the radio scheduling method 500 according to the embodiments of this application, and the radio scheduling apparatus 600 may include units configured to perform the method performed by the terminal in the radio scheduling method 500. In addition, the units in the radio scheduling apparatus 600 and the foregoing other operations and/or functions are separately used to implement corresponding procedures of the radio scheduling method 500. For a specific process of performing the foregoing corresponding steps by the units, refer to the foregoing descriptions with reference to the method embodiments in FIG. 10 and FIG. 11. For brevity, details are not described herein.

Figure 13:
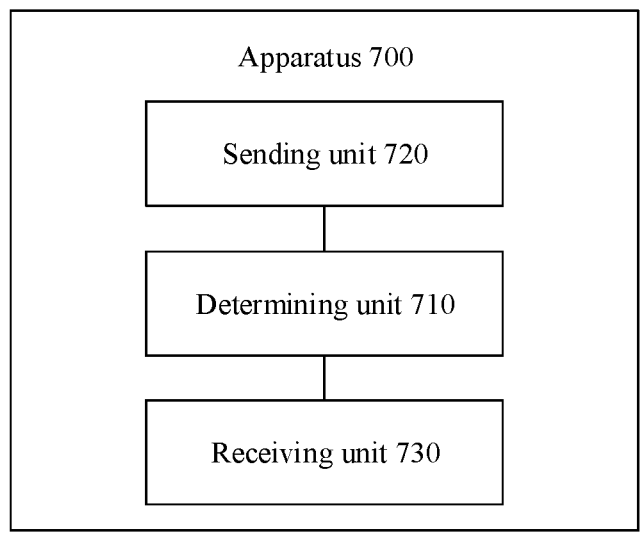
FIG. 13 is another schematic block diagram of a radio scheduling apparatus according to an embodiment of this application.

FIG. 13 is a schematic block diagram of a radio scheduling apparatus 700 according to an embodiment of this application. As shown in FIG. 13, the radio scheduling apparatus 700 may include a determining unit 710, a sending unit 720, and a receiving unit 730.

In an embodiment, the radio scheduling apparatus may be the network device in the foregoing method 300 to the method 500, or may be a chip disposed in the network device.

For example, the determining unit 710 is configured to determine a first parameter of one or more logical channels, and the first parameter includes a repetition quantity parameter of the one or more logical channels.

The sending unit 720 is configured to send a first message to a terminal, and the first message includes the first parameter.

The receiving unit 730 is configured to receive, on a first logical channel, service data sent by the terminal, where the first logical channel is determined by the terminal based on the first parameter.

Optionally, the repetition quantity parameter includes a minimum repetition quantity.

Optionally, the repetition quantity parameter includes one or more repetition quantities.

Optionally, the determining unit 710 is further configured to determine a second parameter of the one or more logical channels, and the second parameter includes at least one of a scheduling periodicity parameter, a modulation and coding scheme parameter, power information, or frequency hopping information of the one or more logical channels.

Optionally, the second parameter includes the scheduling periodicity parameter, and the scheduling periodicity parameter is a maximum scheduling periodicity.

Optionally, the second parameter includes the scheduling periodicity parameter, and the scheduling periodicity parameter includes one or more scheduling periodicities.

It should be understood that the radio scheduling apparatus 700 may correspond to the network device in the radio scheduling method 300 according to the embodiments of this application, and the radio scheduling apparatus 700 may include units configured to perform the method performed by the network device in the radio scheduling method 300. In addition, the units in the radio scheduling apparatus 700 and the foregoing other operations and/or functions are separately used to implement corresponding procedures of the radio scheduling method 300. For a specific process of performing the foregoing corresponding steps by the units, refer to the foregoing descriptions with reference to the method embodiments in FIG. 5 to FIG. 7. For brevity, details are not described herein.

In another embodiment, the determining unit 710 is configured to determine a first parameter of one or more logical channels, and the first parameter includes an index of an uplink grant resource corresponding to each of the one or more logical channels.

The sending unit 720 is configured to send a first message to a terminal, and the first message includes the first parameter.

The receiving unit 730 is configured to receive, on a first logical channel, service data sent by the terminal, where the first logical channel is determined by the terminal based on the first parameter.

It should be understood that the radio scheduling apparatus 700 may correspond to the network device in the radio scheduling method 400 according to the embodiments of this application, and the radio scheduling apparatus 700 may include units configured to perform the method performed by the network device in the radio scheduling method 400. In addition, the units in the radio scheduling apparatus 700 and the foregoing other operations and/or functions are separately used to implement corresponding procedures of the radio scheduling method 400. For a specific process of performing the foregoing corresponding steps by the units, refer to the foregoing descriptions with reference to the method embodiments in FIG. 8 and FIG. 9. For brevity, details are not described herein.

In another embodiment, the determining unit 710 is configured to determine a first parameter of one or more logical channels, and the first parameter includes an index of a bandwidth part group corresponding to each of the one or more logical channels.

The sending unit 720 is configured to send a first message to a terminal, and the first message includes the first parameter.

The receiving unit 730 is configured to receive, on a first logical channel, service data sent by the terminal, where the first logical channel is determined by the terminal based on the first parameter.

It should be understood that the radio scheduling apparatus 700 may correspond to the network device in the radio scheduling method 500 according to the embodiments of this application, and the radio scheduling apparatus 700 may include units configured to perform the method performed by the network device in the radio scheduling method 500. In addition, the units in the radio scheduling apparatus 700 and the foregoing other operations and/or functions are separately used to implement corresponding procedures of the radio scheduling method 500. For a specific process of performing the foregoing corresponding steps by the units, refer to the foregoing descriptions with reference to the method embodiments in FIG. 10 and FIG. 11. For brevity, details are not described herein.

Figure 14:
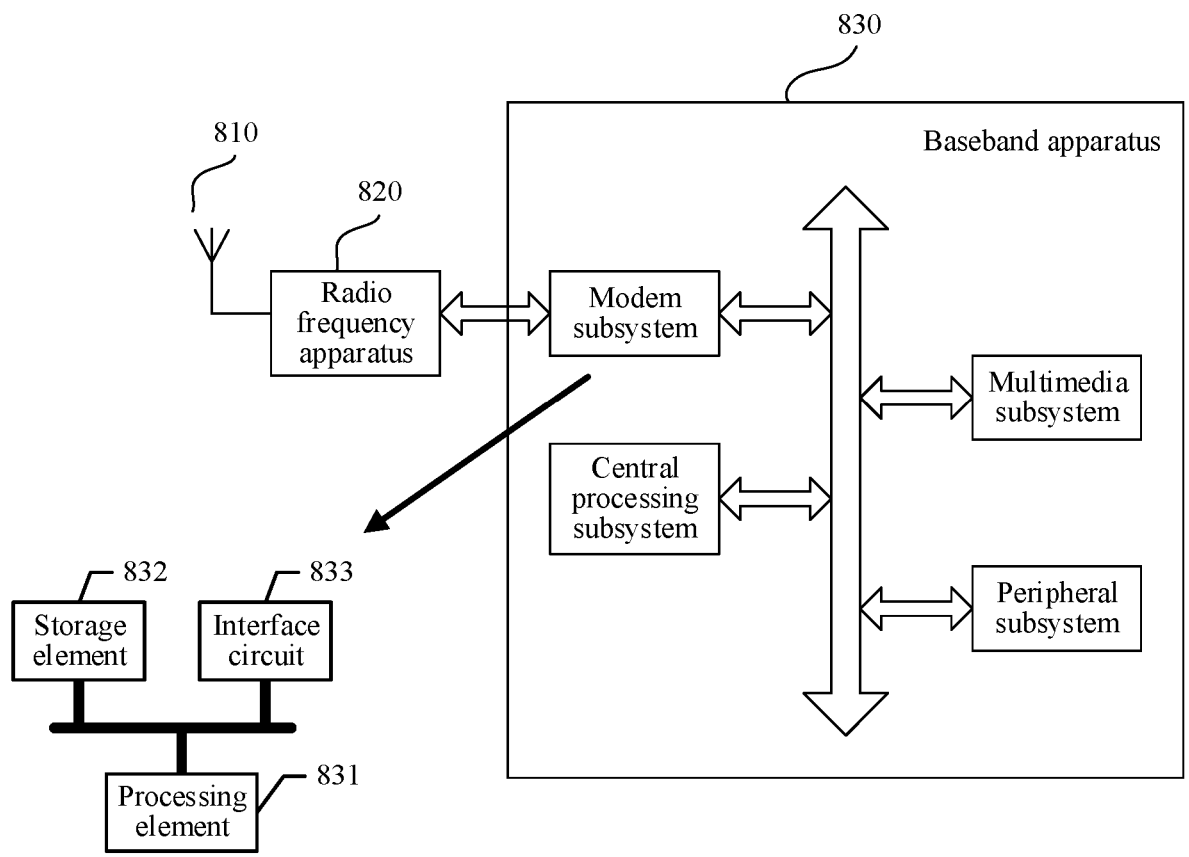
FIG. 14 is a schematic structural diagram of a terminal according to an embodiment of this application.

FIG. 14 is a schematic structural diagram of a terminal according to an embodiment of this application. The terminal may be the terminal in the foregoing embodiment, and is configured to implement an operation of the terminal in the foregoing embodiment. As shown in FIG. 14, the terminal includes an antenna 810, a radio frequency part 820, and a signal processing part 830. The antenna 810 is connected to the radio frequency part 820. In a downlink direction, the radio frequency part 820 receives, through the antenna 810, information sent by a network device, and sends, to the signal processing part 830 for processing, the information sent by the network device. In an uplink direction, the signal processing part 830 processes information from the terminal, and sends the information to the radio frequency part 820. The radio frequency part 820 processes the information from the terminal, and then sends the processed information to the network device through the antenna 810.

The signal processing part 830 may include a modem subsystem, configured to process data at each communications protocol layer. The signal processing part 830 may further include a central processing subsystem, configured to implement processing of an operating system and an application layer of the terminal. In addition, the signal processing part 830 may further include another subsystem, for example, a multimedia subsystem or a peripheral subsystem. The multimedia subsystem is configured to control a camera or a screen display of the terminal, and the peripheral subsystem is configured to implement a connection to another device. The modem subsystem may be a separately disposed chip. Optionally, the foregoing apparatus used for the terminal may be located in the modem subsystem.

The modem subsystem may include one or more processing elements 831, for example, include one main control CPU and another integrated circuit. In addition, the modem subsystem may further include a storage element 832 and an interface circuit 833. The storage element 832 is configured to store data and a program. However, a program used to perform the methods performed by the terminal in the foregoing methods may not be stored in the storage element 832, but is stored in a memory outside the modem subsystem, and is loaded and used by the modem subsystem when to be used. The interface circuit 833 is configured to communicate with another subsystem. The foregoing apparatus used for the terminal may be located in the modem subsystem. The modem subsystem may be implemented by using a chip. The chip includes at least one processing element and interface circuit. The processing element is configured to perform the steps of any method performed by the terminal. The interface circuit is configured to communicate with another apparatus. In an implementation, units of the terminal that implement the steps in the foregoing methods may be implemented by a processing element scheduling a program. For example, the apparatus used for the terminal includes a processing element and a storage element. The processing element invokes a program stored in the storage element, to perform the methods performed by the terminal in the foregoing method embodiments. The storage element may be a storage element located on a same chip as the processing element, that is, an on-chip storage element.

In another embodiment, the program used to perform the methods performed by the terminal in the foregoing methods may be in a storage element located on a different chip from the processing element, that is, an off-chip storage element. In this case, the processing element invokes or loads the program from the off-chip storage element to the on-chip storage element, to invoke and perform the methods performed by the terminal in the foregoing method embodiments.

In still another embodiment, units of the terminal that implement the steps in the foregoing methods may be configured as one or more processing elements. These processing elements are disposed on the modem subsystem. The processing element herein may be an integrated circuit, for example, one or more application-specific integrated circuits (ASIC), one or more digital signal processors (DSP), one or more field programmable gate arrays (FPGA), or a combination of these types of integrated circuits. The integrated circuits may be integrated together to form a chip.

Units of the terminal that implement the steps in the foregoing methods may be integrated together, and implemented in a form of a system-on-a-chip (SOC). The SOC chip is configured to implement the foregoing methods. At least one processing element and storage element may be integrated into the chip, and the processing element invokes a program stored in the storage element to implement the foregoing methods performed by the terminal. Alternatively, at least one integrated circuit may be integrated into the chip, to implement the foregoing methods performed by the terminal. Alternatively, with reference to the foregoing implementations, functions of some units may be implemented by the processing element invoking a program, and functions of some units may be implemented by the integrated circuit.

It can be learned that the foregoing apparatus used for the terminal may include at least one processing element and interface circuit. The at least one processing element is configured to perform any one of the methods that are provided in the foregoing method embodiments and performed by the terminal. The processing element may perform some or all steps performed by the terminal, in a first manner, to be specific, by invoking the program stored in the storage element; or may perform some or all steps performed by the terminal, in a second manner, to be specific, by using a hardware integrated logic circuit in the processor element in combination with instructions; or may certainly perform, by combining the first manner and the second manner, some or all steps performed by the terminal.

As described above, the processing element herein may be a general-purpose processor, for example, a CPU, or may be one or more integrated circuits configured to implement the foregoing methods, for example, one or more ASICs, one or more microprocessors DSPs, one or more FPGAs, or a combination of at least two of the integrated circuits.

The storage element may be one memory, or may be a general name of a plurality of storage elements.

Figure 15:
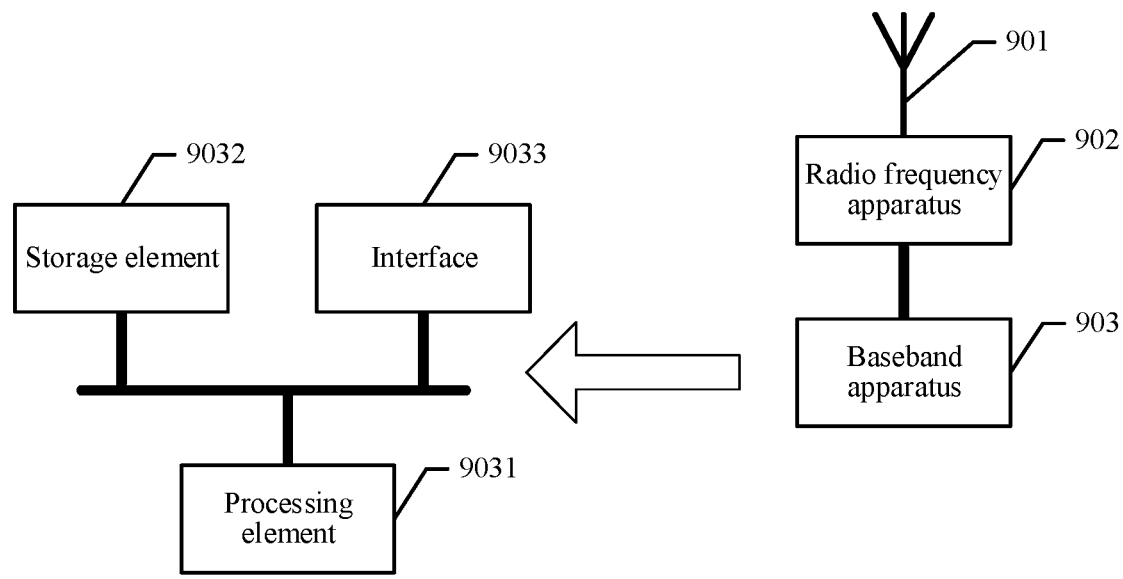
FIG. 15 is a schematic structural diagram of a network device according to an embodiment of this application.

FIG. 15 is a schematic structural diagram of a network device according to an embodiment of this application. The network device may be the network device in the foregoing embodiment, and is configured to implement an operation of the network device in the foregoing embodiment. As shown in FIG. 15, the network device includes an antenna 901, a radio frequency apparatus 902, and a baseband apparatus 903. The antenna 901 is connected to the radio frequency apparatus 902. In an uplink direction, the radio frequency apparatus 902 receives, by using the antenna 901, information sent by a terminal, and sends, to the baseband apparatus 903 for processing, the information sent by the terminal. In a downlink direction, the baseband apparatus 903 processes information about the terminal, and sends the information to the radio frequency apparatus 902. The radio frequency apparatus 902 processes the information about the terminal, and then sends the processed information to the terminal by using the antenna 201.

The baseband apparatus 903 may include one or more processing elements 9031, for example, include one main control CPU and another integrated circuit. In addition, the baseband apparatus 903 may further include a storage element 9032 and an interface 9033. The storage element 9032 is configured to store a program and data. The interface 9033 is configured to exchange information with the radio frequency apparatus 902, and the interface is, for example, a common public radio interface (CPRI). The foregoing apparatus used for the network device may be located in the baseband apparatus 903. For example, the foregoing apparatus used for the network device may be a chip on the baseband apparatus 903. The chip includes at least one processing element and interface circuit. The processing element is configured to perform the steps of any one of the methods performed by the network device. The interface circuit is configured to communicate with another apparatus. In an implementation, units of the network device that implement the steps in the foregoing methods may be implemented by a processing element scheduling a program. For example, the apparatus used for the network device includes a processing element and a storage element. The processing element invokes a program stored in the storage element, to perform the methods performed by the network device in the foregoing method embodiments. The storage element may be a storage element located on a same chip as the processing element, that is, an on-chip storage element, or may be a storage element located on a different chip from the processing element, that is, an off-chip storage element.

In another embodiment, units of the network device that implement the steps in the foregoing methods may be configured as one or more processing elements. These processing elements are disposed on the baseband apparatus. The processing element herein may be an integrated circuit, for example, one or more ASICs, one or more DSPs, one or more FPGAs, or a combination of these types of integrated circuits. The integrated circuits may be integrated together to form a chip.

Units of the network device that implement the steps in the foregoing methods may be integrated together, and implemented in a form of an SOC. For example, the baseband apparatus includes the SOC chip, configured to implement the foregoing methods. At least one processing element and storage element may be integrated into the chip, and the processing element invokes a program stored in the storage element to implement the foregoing methods performed by the network device. Alternatively, at least one integrated circuit may be integrated into the chip, to implement the foregoing methods performed by the network device. Alternatively, with reference to the foregoing implementations, functions of some units may be implemented by the processing element invoking a program, and functions of some units may be implemented by the integrated circuit.

It can be learned that the foregoing apparatus used for the network device may include at least one processing element and interface circuit. The at least one processing element is configured to perform any one of the methods that are provided in the foregoing method embodiments and performed by the network device. The processing element may perform some or all steps performed by the network device, in a first manner, to be specific, by invoking the program stored in the storage element; or may perform some or all steps performed by the network device, in a second manner, to be specific, by using a hardware integrated logic circuit in the processor element in combination with instructions; or may certainly perform, by combining the first manner and the second manner, some or all steps performed by the network device.

As described above, the processing element herein may be a general-purpose processor, for example, a CPU, or may be one or more integrated circuits configured to implement the foregoing methods, for example, one or more ASICs, one or more microprocessors DSPs, one or more FPGAs, or a combination of at least two of the integrated circuits.

The storage element may be one memory, or may be a general name of a plurality of storage elements.

Figure 16:
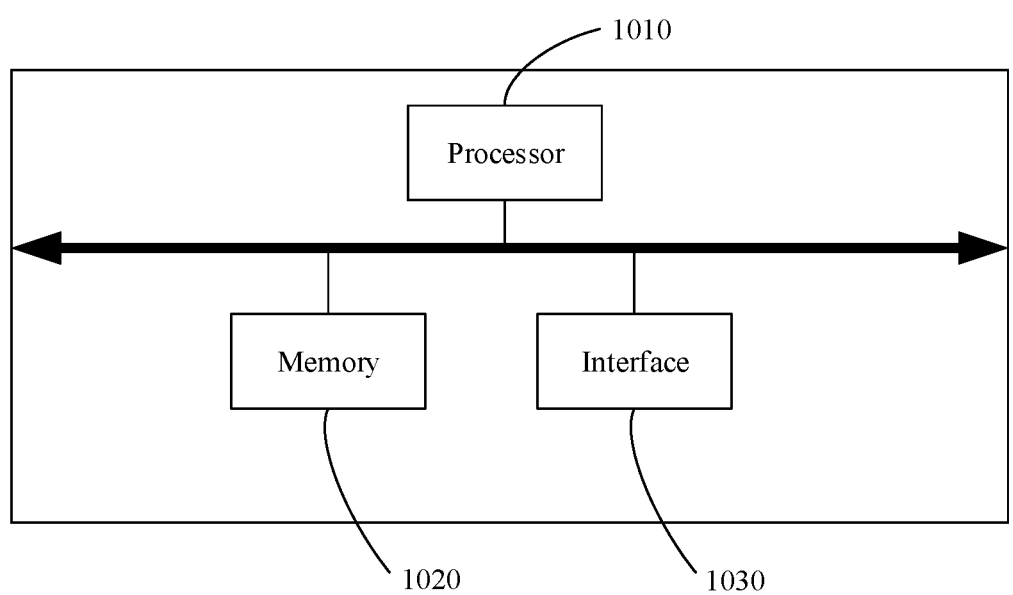
FIG. 16 is another schematic structural diagram of a network device according to an embodiment of this application.

FIG. 16 is another schematic structural diagram of a network device according to an embodiment of this application. The network device may be the network device in the foregoing embodiment, and is configured to implement an operation of the network device in the foregoing embodiment.

As shown in FIG. 16, the network device includes a processor 1010, a memory 1020, and an interface 1030. The processor 1010, the memory 1020, and the interface 1030 are signal-connected.

The radio scheduling apparatus 600 may be located in the network device, and functions of the units may be implemented by the processor 1010 by invoking a program stored in the memory 1020. That is, the foregoing radio scheduling apparatus 600 includes a memory and a processor. The memory is configured to store a program, and the program is invoked by the processor to perform the methods in the foregoing method embodiments. The processor herein may be an integrated circuit having a signal processing capability, for example, a CPU. Alternatively, functions of the foregoing units may be implemented by one or more integrated circuits configured to implement the foregoing methods, for example, one or more ASICs, one or more microprocessors DSPs, one or more FPGAs, or a combination of at least two of the integrated circuits. Alternatively, the foregoing implementations may be combined.

According to the methods provided in the embodiments of this application, this application further provides a computer program product. The computer program product includes computer program code. When the computer program code is run on a computer, the computer is enabled to perform the methods in the foregoing embodiments.

According to the methods provided in the embodiments of this application, this application further provides a computer-readable medium. The computer-readable medium stores program code. When the program code is run on a computer, the computer is enabled to perform the methods in the foregoing embodiments.

The terminal and the network device in the foregoing apparatus embodiments may completely correspond to the terminal or the network device in the method embodiments, and a corresponding module or unit performs a corresponding step. For example, when the apparatus is implemented in a chip manner, the receiving unit may be an interface circuit that is of the chip and that is configured to receive a signal from another chip or apparatus. The foregoing sending unit is an interface circuit of the apparatus, and is configured to send a signal to another apparatus. For example, when the apparatus is implemented in a chip manner, the sending unit is an interface circuit that is of the chip and that is configured to send a signal to another chip or apparatus.

An embodiment of this application further provides a communications system. The communications system includes the foregoing terminal and/or the foregoing network device.

In the embodiments of this application, it should be noted that the foregoing method embodiments in the embodiments of this application may be applied to a processor, or may be implemented by a processor. The processor may be an integrated circuit chip and has a signal processing capability. In an implementation process, steps in the foregoing method embodiments can be implemented by using a hardware integrated logic circuit in the processor, or by using instructions in a form of software. The foregoing processor may be a general purpose processor, a DSP, an ASIC, an FPGA or another programmable logic device, a discrete gate or transistor logic device, or a discrete hardware component. The processor may implement or perform the methods, the steps, and the logical block diagrams that are disclosed in the embodiments of this application. The general purpose processor may be a microprocessor, or the processor may be any conventional processor or the like. Steps of the methods disclosed with reference to the embodiments of this application may be directly executed and accomplished by using a hardware decoding processor, or may be executed and accomplished by using a combination of hardware and software modules in the decoding processor. The software module may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the steps in the foregoing methods in combination with hardware of the processor.

It may be understood that the memory in the embodiments of this application may be a volatile memory or a nonvolatile memory, or may include a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), and is used as an external cache. Through example but not limitative description, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus dynamic random access memory (DR RAM). It should be noted that the memory of the systems and methods described in this specification includes but is not limited to these and any memory of another proper type.

The terms "uplink" and "downlink" in this application are used to describe a data/information transmission direction in a specific scenario. For example, an "uplink" direction is usually a direction in which data/information is transmitted from a terminal to a network side, or a direction in which data/information is transmitted from a distributed unit to a centralized unit, and a "downlink" direction is usually a direction in which data/information is transmitted from a network side to a terminal, or a direction in which data/information is transmitted from a centralized unit to a distributed unit. It may be understood that the "uplink" and the "downlink" are only used to describe transmission directions of data/information, and a device whose specific start point and end point of transmitting the data/information is not limited.

Names may be assigned to various objects that may appear in this application, such as various messages/information/devices/network elements/systems/apparatuses/actions/operations/procedures/concepts. It may be understood that these specific names do not constitute a limitation on the related objects, and the assigned names may change with a factor such as a scenario, a context, or a use habit. Technical meanings of technical terms in this application should be understood and determined mainly based on functions and technical effects that are of the technical terms and that are reflected/performed in the technical solutions.

In the embodiments of this application, architectures of the CU and the DU are not limited to the 5G NR gNB, and may be further applied to a scenario in which an LTE base station is divided into the CU and the DU. The CU may be further divided into two parts: a CP and a UP. Optionally, in the LTE base station, the protocol layer does not include an SDAP layer.

The network architecture and the service scenario described in the embodiments of this application are intended to make readers understand the technical solutions in the embodiments of this application more clearly, and do not constitute a limitation on the technical solutions provided in the embodiments of this application. A person of ordinary skill in the art may know that: With the evolution of the network architecture and the emergence of new service scenarios, the technical solutions provided in the embodiments of this application are also applicable to similar technical problems.

All or some of the foregoing embodiments may be implemented by using software, hardware, firmware, or any combination thereof. When software is used to implement the embodiments, the embodiments may be implemented completely or partially in a form of a computer program product. The computer program product may include one or more computer instructions. When the computer program instructions are loaded and executed on the computer, the procedure or functions according to the embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic disk), an optical medium (for example, a DVD), a semiconductor medium (for example, a solid-state drive (SSD)), or the like.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A radio scheduling method, comprising:
receiving, by a terminal, a first message from a network device, wherein the first message indicates at least one index, each of the at least one index associated with an uplink grant resource corresponding to a logical channel;
obtaining, by the terminal, a first uplink grant resource from the network device; and
determining, by the terminal, a first logical channel based on an index of the first uplink grant resource and the at least one index, wherein the at least one index comprises the index of the first uplink grant resource; and
wherein the obtaining, by the terminal, a first uplink grant resource from the network device comprises:
receiving, by the terminal, downlink control information (DCI) from the network device, wherein the DCI indicates the uplink grant resource.

2. The method according to claim 1, further comprising: sending service data of the first logical channel using the first uplink grant resource.

3. The method according to claim 1, further comprising: indicating, by a physical layer, the index of the first uplink grant resource to a media access control (MAC) layer.

4. The method according to claim 3, wherein the index of the first uplink grant resource is comprised in uplink information indicated by the physical layer to the MAC layer.

5. The method according to claim 1, wherein the obtaining, by the terminal, a first uplink grant resource from the network device comprises:
obtaining, by the terminal, a plurality of uplink grant resources, wherein the plurality of uplink grant resources comprise a preconfigured uplink grant resource and an uplink grant resource indicated by a random access response (RAR); and
using the preconfigured uplink grant resource when a sending duration of a physical uplink shared channel (PUSCH) of the preconfigured uplink grant resource does not overlap a sending duration of a PUSCH of the uplink grant resource indicated by the RAR.

6. The method according to claim 5, further comprising: using the uplink grant resource indicated by the RAR when sending durations of PUSCHs corresponding to the plurality of uplink grant resources at least partially overlap.

7. A radio scheduling apparatus, comprising:
a memory storing program instructions;
at least one interface circuit; and
a processor coupled to the memory, wherein the program instructions, when executed by the processor, cause the apparatus to:
receive a first message from a network device, wherein the first message indicates at least one index, each of the at least one index associated with an uplink grant resource corresponding to a logical channel;
obtain a first uplink grant resource from the network device; and
determine a first logical channel based on an index of the first uplink grant resource and the at least one index, wherein the at least one index comprises the index of the first uplink grant resource; and
wherein the instructions that cause the apparatus to obtain a first uplink grant resource from the network device comprise:
instructions that cause the apparatus to receive downlink control information (DCI) from the network device, wherein the DCI indicates the uplink grant resource.

8. The apparatus according to claim 7, wherein the program instructions, when executed by the processor, further cause the apparatus to:
send service data of the first logical channel using the first uplink grant resource.

9. The apparatus according to claim 7, wherein the at least one interface circuit comprises a first interface circuit and a second interface circuit, and the program instructions, when executed by the processor, further cause the apparatus to:
indicate, by the first interface circuit, the index of the first uplink grant resource to the second interface circuit.

10. The apparatus according to claim 9, wherein the index of the first uplink grant resource is comprised in uplink information indicated by the first interface circuit to the second interface circuit.

11. The apparatus according to claim 7, wherein the instructions that cause the apparatus to obtain a first uplink grant resource from the network device comprises:
instructions that cause the apparatus to obtain a plurality of uplink grant resources, wherein the plurality of uplink grant resources comprise a preconfigured uplink grant resource and an uplink grant resource indicated by a random access response (RAR); and
use the preconfigured uplink grant resource when a sending duration of a physical uplink shared channel (PUSCH) of the preconfigured uplink grant resource does not overlap a sending duration of a PUSCH of the uplink grant resource indicated by the RAR.

12. The method according to claim 11, wherein execution of the program instructions further cause the apparatus to:
use the uplink grant resource indicated by the RAR when sending durations of PUSCHs corresponding to the plurality of uplink grant resources at least partially overlap.

13. A radio scheduling apparatus, comprising:
a memory storing program instructions;
at least one interface circuit; and
a processor coupled to the memory, wherein the program instructions, when executed by the processor, cause the apparatus to:
send a first message to a terminal, wherein the first message indicates at least one index, each of the at least one index associated with an uplink grant resource corresponding to a logical channel;

send a first uplink grant resource to the terminal; and
receive, on the first uplink grant resource, service data of a first logical channel, wherein the at least one index comprises an index of the first uplink grant resource; and wherein the instructions that cause the apparatus to send a first uplink grant resource to the terminal comprise:

instructions that cause the apparatus to:

send downlink control information (DCI) to the terminal, wherein the DCI indicates the uplink grant resource.

14. The apparatus according to claim 13, wherein the instructions that cause the apparatus to send a first uplink grant resource to the terminal comprises:

instructions that cause the apparatus to:

send a plurality of uplink grant resources, wherein the plurality of uplink grant resources comprise a preconfigured uplink grant resource and an uplink grant resource indicated by a random access response (RAR).

* * * * *